(12) United States Patent
Berkner et al.

(10) Patent No.: US 7,792,362 B2
(45) Date of Patent: Sep. 7, 2010

(54) REFORMATTING DOCUMENTS USING DOCUMENT ANALYSIS INFORMATION

(75) Inventors: Kathrin Berkner, Menlo Park, CA (US); Christophe Marle, Seattle, WA (US); Edward L. Schwartz, Sunnyvale, CA (US); Michael J. Gormish, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 439 days.

(21) Appl. No.: 11/893,825

(22) Filed: Aug. 16, 2007

(65) Prior Publication Data

US 2008/0037873 A1 Feb. 14, 2008

Related U.S. Application Data

(62) Division of application No. 10/354,811, filed on Jan. 29, 2003, now Pat. No. 7,272,258.

(51) Int. Cl.
*G06K 9/34* (2006.01)
(52) U.S. Cl. .................... 382/176; 382/282; 382/298
(58) Field of Classification Search .............. 382/173, 382/176, 177, 282, 292, 298
See application file for complete search history.

(56) References Cited

U.S. PATENT DOCUMENTS

| 5,495,567 | A |   | 2/1996  | Iizawa et al. |
|-----------|---|---|---------|---------------|
| 5,619,594 | A | * | 4/1997  | Melen ................ 382/233 |
| 5,625,767 | A |   | 4/1997  | Bartell et al. |
| 5,761,485 | A |   | 6/1998  | Munyan |
| 5,781,773 | A |   | 7/1998  | Vanderpool et al. |
| 5,781,879 | A |   | 7/1998  | Arnold et al. |
| 5,897,644 | A |   | 4/1999  | Nielsen |
| 5,960,126 | A |   | 9/1999  | Nielsen et al. |
| 5,963,966 | A |   | 10/1999 | Mitchell et al. |
| 6,018,710 | A |   | 1/2000  | Wynblatt et al. |
| 6,043,802 | A |   | 3/2000  | Gormish |
| 6,141,452 | A |   | 10/2000 | Murao |
| 6,144,974 | A |   | 11/2000 | Gartland |
| 6,173,286 | B1 |  | 1/2001  | Guttman et al. |
| 6,178,272 | B1 |  | 1/2001  | Segman |
| 6,236,987 | B1 |  | 5/2001  | Horowitz et al. |
| 6,249,808 | B1 |  | 6/2001  | Seshadri |

(Continued)

FOREIGN PATENT DOCUMENTS

EP     1 560 127 A2     8/2005

(Continued)

OTHER PUBLICATIONS

Japanese Office Action dated Jun. 9, 2009; Application No. 2004-018221.

(Continued)

*Primary Examiner*—Phuoc Tran
(74) *Attorney, Agent, or Firm*—Blakely, Sokoloff, Taylor & Zafman LLP

(57) ABSTRACT

A method and apparatus for reformatting electronic documents is disclosed. In one embodiment, the method comprises performing layout analysis on an electronic version of a document to locate text zones, assigning attributes for scale and importance to text zones in the electronic version of the document, and reformatting text in the electronic version of the document based on the attributes to create an image.

18 Claims, 13 Drawing Sheets

U.S. PATENT DOCUMENTS

| | | | |
|---|---|---|---|
| 6,317,164 | B1 | 11/2001 | Hrusecky et al. |
| 6,349,132 | B1 | 2/2002 | Wesemann et al. |
| 6,377,704 | B1 | 4/2002 | Cooperman |
| 6,598,054 | B2 | 7/2003 | Schuetze et al. |
| 6,665,841 | B1 | 12/2003 | Mahoney et al. |
| 6,704,024 | B2 | 3/2004 | Robotham et al. |
| 6,747,648 | B2 | 6/2004 | Hoehn et al. |
| 6,778,970 | B2 | 8/2004 | Au |
| 6,788,347 | B1 | 9/2004 | Kim et al. |
| 6,804,418 | B1 | 10/2004 | Yu et al. |
| 6,862,713 | B1 | 3/2005 | Kraft et al. |
| 6,873,343 | B2 | 3/2005 | Chui |
| 6,924,904 | B2 | 8/2005 | Stevens et al. |
| 6,970,602 | B1 | 11/2005 | Smith et al. |
| 7,010,746 | B2 | 3/2006 | Purvis |
| 7,020,839 | B1 | 3/2006 | Hosoda |
| 7,035,438 | B2 | 4/2006 | Harrington et al. |
| 7,069,506 | B2 | 6/2006 | Rosenholtz et al. |
| 7,107,525 | B2 | 9/2006 | Purvis |
| 7,151,547 | B2 | 12/2006 | Lin et al. |
| 7,171,617 | B2 | 1/2007 | Harrington et al. |
| 7,177,488 | B2 | 2/2007 | Berkner et al. |
| 7,203,902 | B2 | 4/2007 | Balinsky |
| 7,272,258 | B2 | 9/2007 | Berkner et al. |
| 7,330,608 | B2 | 2/2008 | Berkner et al. |
| 7,434,159 | B1 | 10/2008 | Lin |
| 7,487,445 | B2 | 2/2009 | Purvis et al. |
| 7,576,756 | B1 | 8/2009 | Good et al. |
| 7,603,620 | B2 | 10/2009 | Erol et al. |
| 2002/0073119 | A1 | 6/2002 | Richard |
| 2002/0184111 | A1 | 12/2002 | Swanson |
| 2003/0014445 | A1 | 1/2003 | Formanek et al. |
| 2003/0182402 | A1 | 9/2003 | Goodman et al. |
| 2004/0019851 | A1 | 1/2004 | Purvis et al. |
| 2004/0025109 | A1 | 2/2004 | Harrington et al. |
| 2004/0120589 | A1 | 6/2004 | Lopresti et al. |
| 2004/0145593 | A1 | 7/2004 | Berkner et al. |
| 2004/0201609 | A1 | 10/2004 | Obrador |
| 2004/0230570 | A1 | 11/2004 | Hatta et al. |
| 2005/0028074 | A1 | 2/2005 | Harrington et al. |
| 2005/0076290 | A1 | 4/2005 | Balinsky |
| 2005/0084136 | A1 | 4/2005 | Xie et al. |
| 2005/0223326 | A1 | 10/2005 | Chang et al. |
| 2005/0246375 | A1 | 11/2005 | Manders et al. |
| 2005/0289127 | A1 | 12/2005 | Giampaolo et al. |
| 2006/0022048 | A1 | 2/2006 | Johnson |
| 2006/0161562 | A1 | 7/2006 | McFarland et al. |
| 2007/0168852 | A1 | 7/2007 | Erol et al. |
| 2007/0198951 | A1 | 8/2007 | Frank |
| 2007/0208996 | A1 | 9/2007 | Berkner et al. |
| 2008/0235207 | A1 | 9/2008 | Berkner |

FOREIGN PATENT DOCUMENTS

| | | |
|---|---|---|
| JP | 10-105694 | 4/1998 |
| JP | 10-116065 | 5/1998 |
| JP | 10-162003 | 6/1998 |
| JP | 2000-231475 | 8/2000 |
| JP | 2000-306103 | 11/2000 |
| JP | 2001-101164 | 4/2001 |
| JP | 2002-3511861 | 12/2002 |

OTHER PUBLICATIONS

R. Fukuhara, "International Standard for Motion Pictures in addition to Still Pcitures: Summary and Application of JPEG2000/Motion-JPEG2000 Second Part," Interface, Japan, Publishing Co., Ltd., Dec. 1, 2002, pp. 137-147.

Zhao, et al., "Narrowing the Semantic Gap-Improved Text-Based Web Document Retrieval Using Visual features," IEEE, pp. 189-200, 2002.

Rollins, Sami, et al, "Wireless and Mobile Networks Performance: Power-Aware Data Management for Small Devices", Proceedings of the 5th ACM International Workshop on Wireless Mobile Multimedia WOWMOM '02, Sep. 2002, pp. 80-87.

Hexel, Rene, et al, "PowerPoint to the People: Suiting the Word to the Audience", Proceedings of the Fifth Conference on Australasian User Interface—vol. 28 AUIC '04, Jan. 2004, pp. 49-56.

Muer, O. Le, et al, "Performance Assessment of a Visual Attention System Entirely Based on a Human Vision Modeling," Proceedings of ICIP 2004, Singapore, 2004, pp. 2327-2330.

Matsuo, Y., et al, "Keyword Extraction from a Single Document using Word Co-occurrence Statistical Information," International Journal on Artificial Intelligence Tools, vol. 13, No. 1, Jul. 13, 2003, pp. 157-169.

Fukumoto, Fumiyo, et al, "An Automatic Extraction of Key Paragraphs Based on Context Dependency," Proceedings of Fifth Conference on Applied Natural Language Processing, 1997, pp. 291-298.

Aiello, Marco, et al, "Document Understanding for a Broad Class of Documents," IJDAR (2002) 5, pp. 1-16.

"About Netpbm," home page for Netpbm downloaded on Jan. 29, 2010, http://netpbm.sourceforge.net/, pp. 1-5.

"Optimization Technology Center of Northwestern University and Argonne National Laboratory," http://www.optimization.eecs.northwestern.edu/, 1 page, downloaded Jan. 29, 2010.

Dowsland, Kathryn A., et al., "Packing Problems," European Journal of Operational Research, 56 (1002) 2-14, North-Holland, 13 pages, 1992.

Iyengar, Vikram, et al., "On Using Rectangle Packing for SOC Wrapper/TAM Co-Optimization," www.ee.duke.edu/~krish/Vikram.uts02.pdf, 6 pages, before Apr. 4, 2010.

Meller, Russell D., et al., "The Facility Layout Problem: Recent and Emerging Trends and Perspectives," Journal of Manufacturing Systems, vol. 15/No. 5 1996, pp. 351-366.

Hahn, Peter, M., "Progress in Solving the Nugent Instances of the Quadratic Assignment Problem," 6 pages, before Apr. 5, 2010.

Gould, Nicholas I.M., et al., "A Quadratic Programming Bibliography," http://www.optimization-online.org/DB_FILE/2001/02/285.pdf, 139 pages, 2001.

Anjos, Miguel F., et al., "A New Mathematical Programming Framework for Facility Layout Design," University of Waterloo Technical Report UW-W&CE#2002-4, www.optimization_online.org./DB_HTML/2002/454.html, 18 pages.

Maderlechner, et al., "Information Extraction from Dcoument Images using Attention Based Layout Sementation," Proceedings of DLIA, 1999, pp. 216-219.

Wang, et al., "MobiPicture—Browsing Pictures on Mobile Devies," 2003 Multimedia Conference, Proceedings of the 11th ACM International Conference on Multimedia, ACM MM'03, ACM 1-58113-722-2/03/0011, Berkeley, California, Nov. 2-8, 2003, 5 pages.

Fan, et al. "Visual Attention Based Image Browsing on Mobile Devices," International Conference on Multimedia and Exp., vol. 1, Baltimore, MD., IEEE, 0-7803-7965-9/03 Jul. 2003, pp. 53-56.

"Human Resources Toolbox, Human Resources Toolbox, Building an Inclusive Development Community: Gender Appropriate Technical Assistance to InterAction Member Agencies on Inclusion of People with Disabilities," Mobility International USA, 2002 Mobility International USA, http://www.miusa.org/idd/keyresources/hrtoolbox/humanresourcestlbx/?searchterm=HumanResources Toolbox, downloaded Feb. 3, 2010, 1 page.

Cormen, Thomas H., Leiserson, Charles, E., and Rivest, Ronald L., Introduction to Algorithms, MIT Press, MC-Graw-Hill, Cambridge Massachusetts, 1997, 6 pages.

Roth, et al., "Auditory Browser for Blind and Visually Impaired Users," CHI'99, Pittsburgh, Pennsylvania, May 15-20, 1999, ACM ISBN 1-58113-158-5, pp. 218-219.

Lam, H., et al., "Summary Thumbnails: Readable Overviews for Small Screen Web Browsers," CHI 2005, Conference Proceedings. Conference on Human Factors in Computing Systems, Portland, Oregon, Apr. 2-7, 2005, CHI Conference Proceedings, Human Factors in Computing Systems, New York, NY: ACM, US, Apr. 2, 2005, XP002378456, ISBN: 1-58113-998-5, pp. 1-10.

Erol, B., et al., "Multimedia Thumbnails: A New Way to Browse Documents on Small Display Devices," Ricoh Technical Report No.

31, XP002438409, Dec. 2005, http://www.ricoh.co.jp/about/business_overview/report/31/pdf/A3112.pdf>, 6 pages.

European Patent Office Search Report for European Patent Application EP 07 25 0134, Jun. 21, 2007, 9 pages.

Erol, Berna, et al., An Optimization Framework for Multimedia Thumbnails for Given Time, Display, and Application Constraints, Aug. 2005, 1-17 pages.

El-Kwae, E., et al., "A Robust Framework for Content-Based Retrieval by Spatial Similarity in Image Databases," Transactions on Information Systems (TOIS), vol. 17, Issue 2, Apr. 1999, pp. 174-198.

Dahl, Joachin and Vandenbeube, Lieven, "CVXOPT: A Python Package for Convex Optimization," http://abel.ee.ucla.edu/cvxopt/ downloaded Feb. 5, 2010, 2 pages.

Grant, Michael, et al., "CVX, Matlab Software for Disciplined Convex Programming," http://www.stanford.edu/~boyd/cvx/, downloaded Feb. 5, 2010, 2 pages.

Haralick, Robert M., "Document Image Understanding: Geometric and Logical Layout," IEEE Computer Vision and Pattern Recognition 1994 (CVPR94), 1063-6919/94, pp. 385-390.

Hsu, H.T., An Algorithm for Finding a Minimal Equivalent Graph of a Digraph, Journal of the ACM (JACM), V. 22 N. 1, Jan. 1975, pp. 11-16.

Nagy, Georgy, et. al., "Hierarchical Representation of Optically Scanned Documents," Proc. Seventh Int'l Conf. Pattern Recognition, Montreal, 1984 pp. 347-349.

Dengel, A., "Anastasil: A System for Low-Level and High-Level Geometric Analysis of Printed Documents" in Henry S. Baird, Horst Bunke, and Kazuhiko Yamamoto, editors, Structured Document Image Analysis, Springer-Verlag, 1992, pp. 70-98.

Duda, et al., "Pattern Classification," Second Edition, Chapter 1—Introduction, Copyright © 2001 by John Wiley & Sons, Inc., New York, ISBN0-471-05669-3 (alk. Paper), 22 pages.

Gao, et al., "An Adaptive Algorithm for Text Detection from Natural Scenes," Proceedings of the 2001 IEEE Computer Society Conferences on Computer Vision and Pattern Recognition, Kauai, HI, USA, Dec. 8-14, 6 pages.

Polyak, et al., "Mathematical Programming: Nonlinear Rescaling and Proximal-like Methods in Convex Optimization," vol. 76, 1997, pp. 265-284.

Baldick, et al., "Efficient Optimization by Modifying the Objective Function: Applications to Timing-Driven VLSI Layout," IEEE Transactions on Circuits and Systems, vol. 48, No. 8, Aug. 2001, pp. 947-956.

Kandemir, et al. "A Linear Algebra Framework for Automatic Determination of Optimal Data Layouts," IEEE Transactions on Parallel and Distributed System, vol. 10, No. 2, Feb. 1999, pp. 115-135.

Lin, Xiaofan, "Active Document Layout Synthesis," IEEE Proceedings of the Eight International Conference on Document Analysis and Recognition, Aug. 29, 2005-Sep. 1, 2005, XP010878059, Seoul, Korea, pp. 86-90.

Boyd, Stephen, et al. "Review of Convex Optimization," Internet Article, http://www.cambridge.org/us/catalogue/catalogue.asp?isbn=0521833787, Cambridge University Press, XP-002531694, Apr. 8, 2004, pp. 1-2.

European Patent Office Search Report for European Patent Application EP 07 25 0928, Jul. 8, 2009, 7 pages.

Harrington, Steven J., et al., "Aesthetic Measures for Automated Document Layout," Proceedings of Document Engineering '04, Milwaukee, Wisconsin, ACM 1-58113-938-1/04/0010, Oct. 28-30, 2004, 3 pages.

Opera Software, "Opera's Small-Screen Rendering™," http://web.archive.org/web/20040207115650/http://www.opera.com/products/smartphone/smallscreen/ downloaded Feb. 25, 2010, pp. 1-4.

"AT&T Natural Voices" website, http://web.archive.org/web/20060318161559/http://www.nextup.com/attnv.html, downloaded Feb. 25, 2010, pp. 1-3.

* cited by examiner

Microsoft requests a stay of this Court's mandate pending deposition of its petition for certiorari. By its terms, Microsoft's petition seeks interlocutory review of a highly fact-based determination that the Supreme Court has said a court of appeals is in the best position to make. Under the circumstances, Microsoft has little prospect of obtaining certiorari review, let alone winning a reversal, of this Court's unanimous, en banc judgement. Moreover, there is no sense in which resumption of proceedings before the district court would injure Microsoft an any way. By contrast, granting a stay would further delay the public's remedy and contribute to uncertainty in the market. Microsoft therefore has not met any of the requirements for a stay. Accordingly, this Court should deny Microsoft's request and issue its mandate immediately.

FIG. 9

Microsoft requests a stay of this Court's mandate pending deposition of its petition for certiorari. By its terms, Microsoft's petition seeks interlocutory review of a highly fact-based determination that the Supreme Court has said a court of appeals is in the best position to make. Under the circumstances, Microsoft has little prospect of obtaining certiorari review, let alone winning a reversal, of this Court's unanimous, en banc judgement. Moreover, there is no sense in which resumption of proceedings before the district court would injure Microsoft an any way. By contrast, granting a stay would further delay the public's remedy and contribute to uncertainty in the market. Microsoft therefore has not met any of the requirements for a stay. Accordingly, this Court should deny Microsoft's request and issue its mandate immediately.

FIG. 10

ARGUED FEBRUARY 26 & 27, 2001.
DECIDED JUNE 28, 2001

IN THE UNITED STATES COURT OF APPEALS FOR THE DISTRICT OF COLUMBIA CIRCUIT

No. 00-5212 UNITED STATES OF AMERICA, Plaintiff-Appellee

Consolidated with No. 00-5213

APPELLEE'S RESPONSE TO MICROSOFT'S MOTION FOR STAY OF THE MANDATE PENDING PETITION FOR WRIT OF CERTIORARI

Microsoft requests a stay of this Court's mandate pending deposition

FIG. 11

- Is this the smallest text you can easily read?
- Is this the smallest text you can easily read?
- Is this the smallest text you can easily read?
- Is this the smallest text you can easily read?
- Is this the smallest text you can easily read?
- Is this the smallest text you can easily read?
- Is this the smallest text you can easily read?
- Is this the smallest text you can easily read?
- Is this the smallest text you can easily read?
- Is this the smallest text you can easily read?
- Is this the smallest text you can easily read?

FIG. 12

REFORMATTING DOCUMENTS USING DOCUMENT ANALYSIS INFORMATION

This is a divisional of application Ser. No. 10/354,811, filed on Jan. 29, 2003, now U.S. Pat. No. 7,272,258, entitled "Reformatting Documents Using Document Analysis Information," assigned to the corporate assignee of the present invention and incorporated herein by reference.

FIELD OF THE INVENTION

The present invention relates to the field of image processing; more particularly, the present invention relates to reformatting documents using layout analysis, document analysis or optical character recognition (OCR) information.

BACKGROUND OF THE INVENTION

Scanned documents are often large, from typically 2 million to 200 million pixels (or samples). Some applications benefit from displaying more compact images representing documents on displays with significantly fewer pixels, called herein constrained displays. Constrained displays can be displays with physically limited number of pixels, such as screens on PDAs, mobile devices, cellphones, office equipment such as digital copier front panels, etc. For example, many PDAs currently have less than 100,000 pixels. Constrained displays can be regions in a larger physical display (e.g., a high resolution monitor, printed page, etc.). Graphical User Interfaces (GUIs) may have regions (e.g., icons, search results, etc.) associated with documents. One type of constrained display is a region for displaying a thumbnail image. A thumbnail image (or thumbnail) is typically 3,000 to 30,000 pixels. Constrained displays may be those in which only the width and height available in the display is not as large as the documents or images being displayed.

A thumbnail is a small image representation of a larger image, usually intended to make it easier and faster to look at or manage a group of larger images. Most thumbnails are usually just downsampled versions of the original picture. In other words, traditional thumbnails rescale an entire document to a required width and height and typically preserve the aspect ratio. Software packages for web thumbnail creation are available that focus on speeding up the process of thumbnail generation. There are also software tools (e.g., pnm tools for UNIX) that perform automatic cropping of margins.

There have been "enhanced thumbnails" to provide a better representation of documents available in HTML format. For example, see Woodruff, A., Faulring, A., Rosenholtz, R., Morrison, J., Pirolli, P., "Using thumbnails to search the Web," Proc. SIGCHI 2001, pp. 198-205, 2001. These enhanced thumbnails are created by lowering the contrast in the traditionally created thumbnail and superimposing keywords found in HTML.

Other work has been done to create more efficient thumbnails such as Ogden, W., Davis, M., Rice, S., "Document thumbnail visualizations for rapid relevance judgments: When do they pay off?," TREC 1998, pp. 528-534. Certain thumbnail representations have special, machine recognizable information encoded into it to allow retrieval of original documents from scanning or other machine input of the thumbnail such as Peairs, M., "Iconic Paper," Proceedings of 3rd ICDAR 95, vol. 2 pp. 1174-1179, 1995.

Other work has been done to create new uses of traditional thumbnails. For example, thumbars are documents that have been reformatted to a fixed width, but unrestricted length and are used in web applications for HTML documents. Key words are displayed in different color codes in the thumbar. In general, the text is not readable. See Graham, J., "The Reader's Helper: a personalized document reading environment," Proc. SIGCHI '99, pp. 481-188, 1999.

Often an icon identifies the type of the file (e.g., the program that created it) instead of being related to the content. In these cases, readability of the text of the original document in the thumbnail is not the goal. Thumbnail representations often have information other than readable text that allow retrieval of original documents from looking at the thumbnail.

The next decades should see a dramatic decline in the use of paper documents in favor of electronic documents. This transition of paper-to-electronic may make the design of scanned document tools strategic for companies. An important characteristic of scanned documents is that objects, especially text, are not identified and recognized in the file. It requires a post-analysis, often by Optical Character Recognition (OCR) (or more generally document analysis) software, that tries to locate and identify text characters, words and lines in scanned documents. The current use of OCR is generally to use the recognized text as a text file output, for keyword search, or as extra information, and to append the text and its location as metadata to the scanned document, as in Adobe Acrobat Capture of Adobe of Mountain View, Calif.

Document analysis system consists of two parts: layout analysis and character recognition (also called optical character recognition or OCR). The character recognition part uses language specific information to interpret characters and groups of characters to produce output in symbolic form such as ASCII. The layout analysis part consists of the steps necessary before performing the character recognition, namely grouping individual foreground pixels into characters or character elements such as strokes (connected ink blobs), finding image regions that contain text and grouping text information units like paragraphs, lines, words and characters. These units are characterized by rectangular bounding boxes. Character recognition is a difficult task and the OCR software may make several mistakes on the document. Small amounts of text in very large fonts, such as some titles, headings, etc., can be particularly difficult to recognize. This can be annoying to the user and mislead applications.

Layout analysis information has already been used for expanding white space (see Chilton, J. K., Cullen, J. F., "Expansion of White Space in Document Images for Digital Scanning Devices"), reducing white space (see U.S. Pat. No. 5,832,530 "Method and Apparatus for Identifying Words Described in a Portable Electronic Document"), or adapting to a constrained display, like a PDA display (see Breuel T. M., Janssen, W. C., Popat, K., Baird, H. S., "Paper to PDA," IEEE 2002, pp. 476-479).

Adobe attaches OCR information to images of scanned documents in order to allow searchability of the text. The OCR information, however, is not used to create thumbnails. If OCR fails for some text, that test is not searchable.

However, no scanned document reformatting method has been done to target a two-dimensional constrained display, based on layout-analysis.

SUMMARY OF THE INVENTION

A method and apparatus for reformatting electronic documents is disclosed. In one embodiment, the method comprises performing layout analysis on an electronic version of a document to locate text zones, assigning attributes for scale and importance to text zones in the electronic version of the document, and reformatting text in the electronic version of the document based on the attributes to create an image.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 9 illustrates an example of a zone in an original document.

FIG. 10 illustrates the zone of FIG. 9 after reflow.

FIG. 11 illustrates an example of a constrained display document representation.

FIG. 12 is an example of GUI for having user select "min_size" for smallest readable text.

DETAILED DESCRIPTION OF THE PRESENT INVENTION

Figure 1:
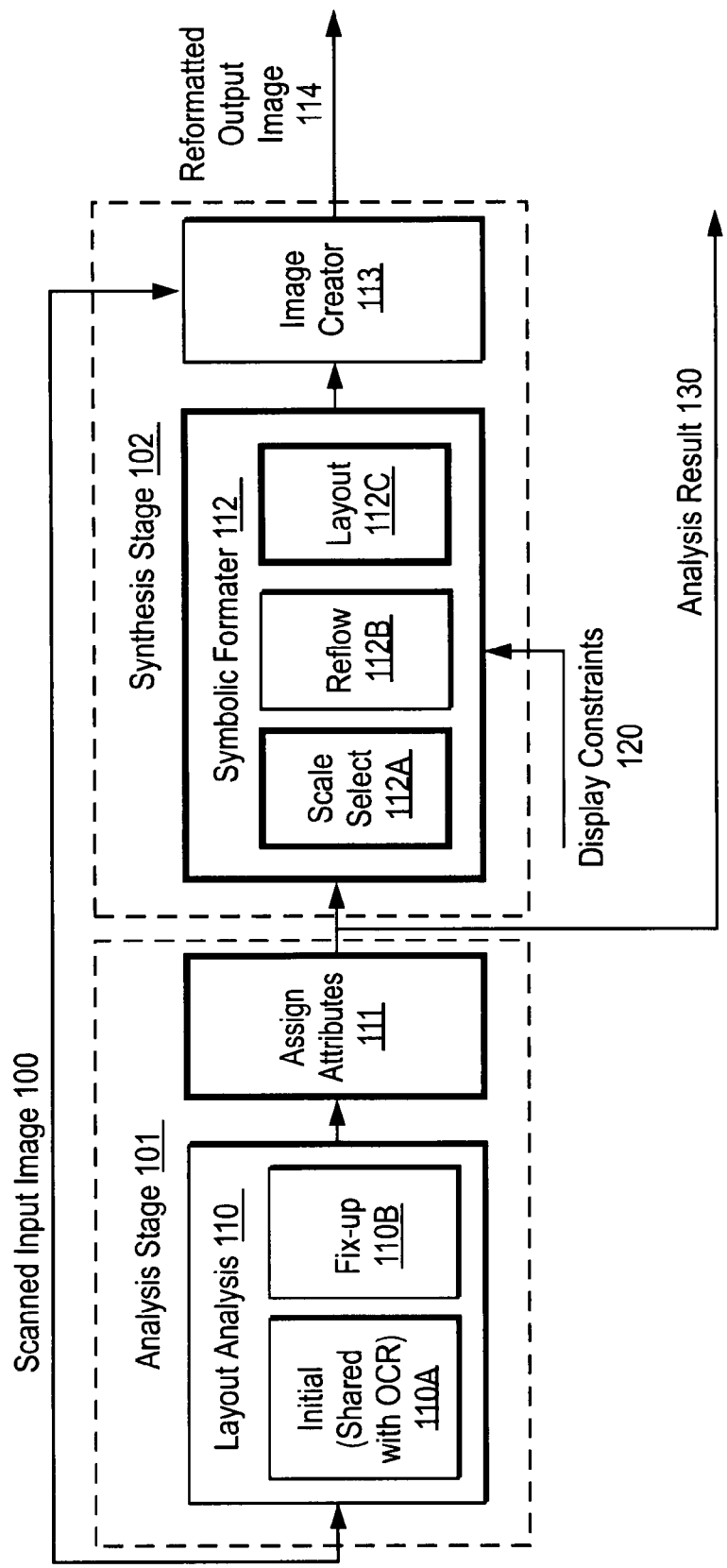
FIG. 1 is a data flow diagram of one embodiment of a reformatted document generator.

A method and apparatus for reformatting scanned documents is described. The teachings herein may be used to address the problem of reformatting the scanned document to achieve a better document representation on a constrained display. A scanned document may be any image or document represented as an image. It may be captured by a scanner, camera or other device or it may be created in digital form by rendering. As described above, one example of a constrained display is a thumbnail. In one embodiment, the resulting reformatted images display in a readable fashion as much relevant text contained in the original document as possible.

More specifically, the techniques disclosed herein provide elements to enable the rearranging of text in a document, without using the semantic meaning of the text. These elements include the use of bounding boxes of text, text reading order, assessment of the relative importance of text regions, scaling possibilities, and the reflow of text. Reformatting may be performed using blank space removal, scaling, reshaping of lines and paragraphs, and intelligent discarding of information (using, for example, importance information such as an importance value described in more detail below).

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A technique is described that uses layout analysis information given by performing document analysis to reformat a scanned document image into a constrained display document representation. FIG. 1 illustrates a data flow diagram of one embodiment of a constrained display document representation generator. This generator may comprise hardware (e.g., circuitry, dedicated logic), software (such as is run on a general purpose computer system or a dedicated machine), or a combination of both.

Referring to FIG. 1, an analysis stage 101 receives a scanned input image 100 and generates a set of text zones in the scanned image along with a set of attributes for each of the text zones. Analysis stage 101 comprises a layout analyzer 110 that generates layout analysis information. In one embodiment, layout analyzer 110 uses document analysis software 110A and optionally fix-up mechanism 110B. In one embodiment, the layout analysis information includes a list of text zones found in the document in reading order, a list of text lines in reading order to each text zone, a list of bounding boxes of the words for each text line, and a statistic describing the character size for each text zone. For example, for each character set used in a zone, the average dimensions (width and height) of this character set is the statistic used. In one embodiment, layout analyzer 110 also provides alignment of text lines (e.g., left, right, centered, justified), font information, normal/bold/italic, etc., and word confidence.

Fixup mechanism 110B may comprise a parser that organizes the information into a hierarchical data structure. This is described in more detail below. Fixup mechanism 110B may also include functionality to adjust the coordinate information in the layout analysis output from corresponding to a de-skewed image to corresponding to the original scanned image.

Analysis stage 101 also includes attribute generator 111 that assigns attributes, as is described in further detail below. The layout analysis information and the attributes are sent to synthesis stage 102. In one embodiment, analysis result 130 is also output.

If the layout analysis information does not contain reading order information, then position order such as top to bottom, and/or left to right or right to left may be used.

Synthesis stage 102 includes a symbolic formatter 112 and image creator 113. In one embodiment, formatter 112 comprises a scale selector 112A to select the scale for each text zone, a reflow computation unit 112B to perform reflow on the text zones, and a layout unit 112C to generate the layout of the constrained display document representation or constrained display output image. Reflow of text is well-known. For example, see U.S. Pat. No. 6,043,802, entitled "Resolution Reduction Technique For Displaying Documents on a Monitor," issued to Gormish, et al. discloses reflow of text in scanned documents for display on a monitor.

These reflow operations performed by formatter 112 are all performed in response to receiving the display constraints 120 with respect to the size of the constrained output display representation, such as, for example, height and width. These constraints may also be called a canvas size or target image size. Formatter 112 works on symbolic data for text zones such as bounding box coordinates. It does not require processing of actual image data.

Image creator 113 generates reformatted output image 114 in response to the output from synthesis stage 102. Actual processing of image data such as cropping, scaling and pasting is performed.

The operations and units described with respect to FIG. 1 will be described in more detail below.

Note that a constrained display document representation can be created for a single page or for the entire document (or some subset of the entire document). This might be especially useful when several documents have an identical or almost identical cover page.

Information from the OCR results (other than font size and position) could be used to weight the inclusion of text. For example, tools used in retrieval and text summarization like inverse document frequency could be used to increase the importance of including the text.

The techniques described herein may be practiced using only layout analysis and not OCR. However, there are advantages in embodiments with OCR. If OCR is required for an application and the layout analysis information can be shared by the OCR and the constrained representation generation, the additional computation required for generating constrained representation generation may be small. Another advantage is that the constrained representation generation does not use OCR results and is therefore immune to OCR errors and can provide useful information when OCR fails.

One Embodiment of a Reformatting Process

Figure 2:
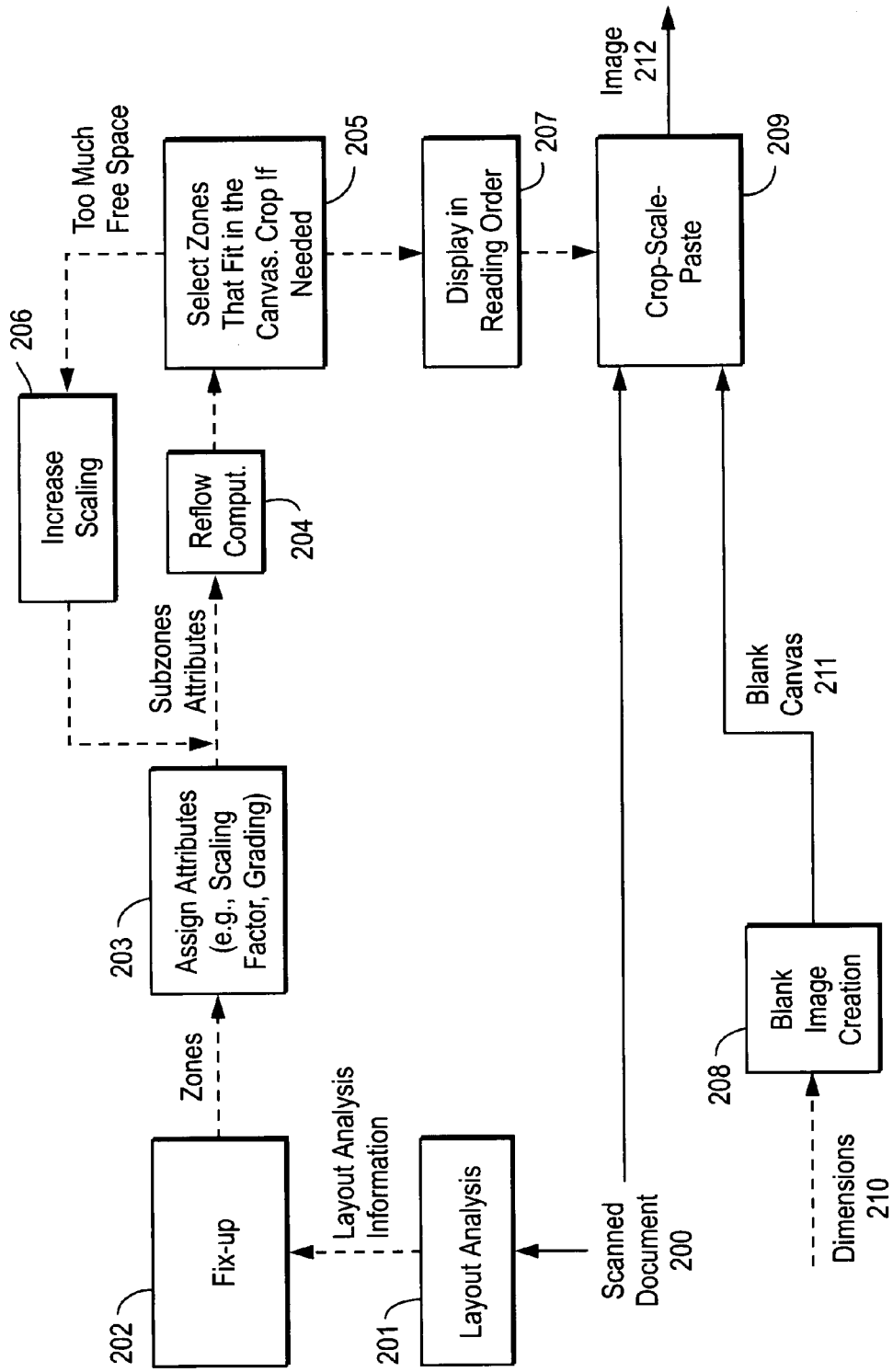
FIG. 2 is a flow diagram of one embodiment of a process for generating reformatted documents.

FIG. 2 illustrates a process for reformatting a document. The process is performed by processing logic that may comprise hardware (circuitry, dedicated logic, etc.), software (such as is run on a general purpose computer system or a dedicated machine), or a combination of both.

In this process, using text zones, in one embodiment, a goal is to display as much text as possible, each text zone is displayed with the text being scaled to the minimum readable size. In one embodiment, the minimum readable size is indicated by a scaling factor. In order to use the available space efficiently, the text in a zone is reflowed to fit in the width of the output display.

Referring to FIG. 2, processing logic initially performs or layout analysis (and optionally OCR also), to obtain layout analysis information (processing block 201). This may be performed by document analysis software 110A of FIG. 1. The OCR provides layout analysis information that provides the position and bounding boxes of text. To reflow text, the location of individual words is needed. To just select and/or crop, large text groups may be used. The analysis information may also provide other information such as, for example, rulings, word confidence, font descriptions, character bounding boxes, etc. The results of the layout analysis process may also provide bounding boxes of images. In one embodiment, the layout analysis information that is obtained includes: groupings of words into lines, groupings of text lines into text zones, the reading order of the text, and alignment type of lines (e.g., centered, left or right).

After obtaining the layout analysis information, processing logic performs any necessary adjustments to the layout analysis information (processing block 202). This may include adjusting the coordinates of bounding boxes to compensate for any deskewing performed during the OCR process. This may also include parsing the layout analysis information.

After obtaining the layout analysis information, processing logic may optionally perform zone segmentation.

Once the text zones have been identified, processing logic obtains a number of attributes for each of the text subzones (processing block 203). This may be performed by attribute generator 111. These attributes may include scaling and/or importance information. In one embodiment, the scaling information is a scaling factor and the importance information is an importance value, or grade. A scaling factor and importance value are generated for each text zone.

The scaling factor attribute is a variable that indicates the amount a text zone may be scaled. In one embodiment, the scaling factor is a lower limit to which the text can be scaled before becoming unreadable. In one embodiment, an empirical relation between the average size of characters in text and the lower scaling limit (for a particular type of display) is used to determine the scaling factor. This is as follows:

$$scaling\_limit = minimal\_readable\_char\_size / char\_size$$

Although dependent upon a particular viewer and display, for example, the minimal readable character size in pixels equals 6 for a 72 dpi CRT monitor but may differ for other devices, e.g., LCD, high contrast displays, or other fonts or intended viewing distance, etc. One way to interpret this relation is to consider that a character size of minimal_readable_char_size pixels is the smallest a typical user can comfortably read on a particular display. By scaling by this scaling limit factor, the text is reduced to this minimal_readable_char_size-pixel dimension.

Alternatively, the minimal readable character size could be determined by adjustment for target display resolution and reading distance. The scaling factor used for synthesis should be adjusted for the target display. A GUI might allow a user to select the desired size for the smallest text (FIG. 12). Each choice would correspond to a different adjustment to the scale factor. The minimum_readable_char_size may be a desired size chosen based on display characteristics, viewing conditions and/or viewer preference and is not limited only to a readability criteria.

The importance value for a text subzone is an attribute that is used to visually assess the importance of a text subzone in the document. In one embodiment, the importance value is determined using the largest character set size in the zone and its position in the page. In one embodiment, the formula given below is used to generate an importance value:

$$importance = char\_size \left[1 - \frac{\left|X - \frac{W}{2}\right|}{W}\right] \cdot \left[1 - \frac{\max\left(Y, \frac{H}{2}\right)}{3H}\right]$$

where X and Y are the horizontal and vertical coordinates, respectively, of the center of gravity of the text zone, W and H are the width and height of the document and W/2 and H/2 are the coordinates of the middle of the document. (X=0 is left, X=W is right, Y=0 is top, Y=H is bottom). Another factor in the equation above considers the horizontal positioning on the page. Specifically, a text zone on the left or right fringe of the page is penalized compared to a centered one. Yet another factor that may be used considers the vertical positioning. Specifically, a zone in the bottom of the page is penalized compared to one in the first half of the page.

In another embodiment, a template is used to associate importance weightings with different regions of the page. In still another alternative embodiment, the importance value is the number of bits spent by a text encoder (e.g., JBIG) to compress the text or portion thereof.

After determining the attributes, processing logic performs a reflow computation to represent the reflow of text contained in a given text zone (processing block 204). (Note that reflow is performed in two stages that are referred to herein as "symbolic reformatting" and "image creation".) The symbolic reformatting of reflow is performed without accessing the image data. Processing logic computes parameters for a remapping of the text by describing how the bounding boxes of the text elements are aligned after a physical reflow of the units. Note, though, that no actual reflowed image output data are produced at this point. The creation of an actual reflow is only done in the image creation stage. This separation between remapping calculations and actual implementation allows computational efficiency if, after looking at the remapping information, the process may decide that the reflow will not be used.

After performing reflow, processing logic selects zones that fit in the canvas (processing block 205). This may be performed by using display constraints 120 of FIG. 1. A canvas may comprise a shape (e.g., rectangle) of pixel units.

Processing logic may also perform cropping. In one embodiment, selecting zones that fit in the canvas comprises processing logic looping over the text zones in order of decreasing importance value. This is accomplished by computing the necessary reflow, so that, after scaling by the scaling factor attribute, the reflown text zone fits in the canvas (the target size) and computing the height that occupies the scaled and reflown text. Then, processing logic tests whether there is enough space to display the current subzone and the previous ones; if not, the loop is exited. If the loop was exited because a zone did not fit in and if this last reflown zone is longer than a threshold number of lines (e.g., 10 lines), then processing logic keeps only the first half of this zone and restarts the loop. The threshold may be set by a user or application. If this last zone is smaller than the threshold number lines (e.g., 10), processing logic keeps as many lines as possible without restarting the loop. Then, if there is enough space for displaying all the zones in their totality, and if less than a set amount (e.g., 60%) of the available space is used, then the scale of the text may be increased. At this point, the loop may be performed again using increased scaling factors (processing block 206). In one embodiment, the scaling factor is increased by 25%, 50%, 100%, or any percentage.

Processing logic generates list of display instructions (e.g., crop, scale, and/or paste instructions) (processing block 207). In one embodiment, these instructions are in reading order. In another embodiment, an output list of instructions is generated with crop locations (e.g., coordinates, height and width), dimensions, scaling (e.g., floating point, rational number) and paste locations (e.g., x and y coordinates).

Once a set of selected zones with the scaling and reflowing instructions has been selected, during the image creation stage, processing logic creates a small image object that contains the reflown and scaled text zone. Processing logic may then paste this image object in a bigger canvas. In one embodiment, processing logic first creates a blank canvas for the reflown text. Processing logic then performs a series of crop and paste operations. That is, processing logic performs the necessary cropping, scaling and pasting operations to text zones from the original scanned document to create the actual image (processing block 209). That is, the actual image may be created by cropping text zones from the original scanned document, scaling them, and pasting them at equal or unequal spacing in the canvas. Cropping may comprise the operation of getting rid of some portion of what is included in the text zone, such as an entire paragraph, or identifying what is to remain in the text zone that is to be displayed. Note that the cropping and pasting result in the reflow.

The image creation process includes processing logic performing blank image creation using dimensions of a target image size (constraints) (processing block 208), resulting in creation of the constrained display canvas, and pasting the results of the processing into the textnail canvas, thereby creating the constrained display image 112.

In another embodiment, when performing image creation, processing logic creates a pool of all the words in the text zone and sequentially adds it to the text line until the line fills the given width and then start another text line.

Figure 17:
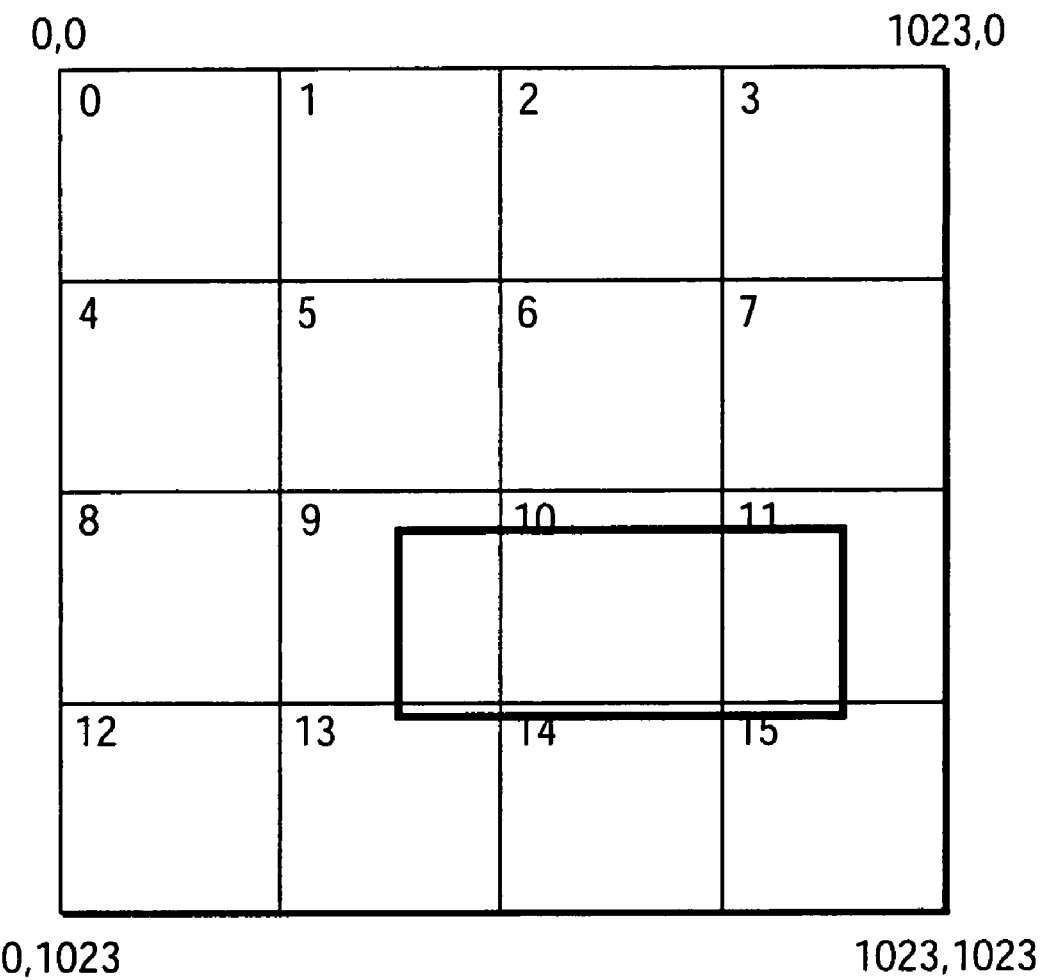
FIG. 17 is an example image illustrating JPEG 2000-based cropping and scaling.

Dyadic scaling of image and area cropping may be performed by a JPEG 2000 decoder if the image is encoded with JPEG 2000. JPEG 2000 compressed images may be scaled to reduce size by a power of two for each level of wavelet transform used for compression simply by only decoding lower resolution wavelet coefficient data. JPEG 2000 images may be cropped by only decoding certain tiles, precincts or codeblocks. By not decoding all of the compressed data, processing time may be reduced. For example, consider a 1024×1024 image shown in FIG. 17 compressed with 256×256 tiles and 5 wavelet transform levels. Consider cropping out the rectangle with corners 400,600 and 900,800 and scaling this by ⅙ in both dimensions. The 6 tiles composing the rectangle with corners 256, 512 and 1024,1024 (tiles 9, 10, 11, 13 14 and 15) and the 4 lowest resolution levels (out of 6, resulting in a ¼ scaling) are decoded. In the 192×128 decoded image, the crop rectangle now has corners (400−256)/4=36, (600−512)/4=22 and (900−256)/4=161 and (800−512)/4=72 and can be cropped with any prior art method. A scaling of (⅙)/(¼)=⅔ can be performed with any prior art method. Thus, the processing effort for the 192×128 decoded image size and not the larger 1024×1024 full image size.

Exemplary Layout Analysis and OCR System

In one embodiment, ScanWorX Version 2.2 for Solaris OCR software from Xerox Imaging Systems of Rochester, N.Y., is used to perform the layout analysis and OCR. In this embodiment, the results are output in a text file format referred to herein as XDOC. The output consists in a series of intermixed markups, with corresponding parameters. Note that many types of layout analysis and/or OCR systems may be employed and are well-known in the art.

From the information output by the layout analysis, the boundaries of objects may be identified in the pixel coordinates of the scanned image. Objects may be, for example, lines, characters, words, text, paragraphs, rulings (vertical or horizontal lines, such as the horizontal line above the inventor's name in a U.S. patent), text zones, image zones, etc. Bounding boxes are typically rectangular areas but could be any description of an image region or area. In one embodiment, software is executed to perform the OCR and it expresses and outputs the layout analysis information in its own coordinate system (e.g., XDOC coordinates). This coordinate system uses a different unit of measure than the scanned image, and doesn't describe exactly this image, but instead describes this image after a de-skewing transform (described in Xerox Imaging Systems, ScanWorX Motif Version 2.2 for Solaris Release Notes). In order to express the location information in the image pixel coordinates system, two operations are applied to the XDOC coordinates. First, an inverse de-skewing operation is performed and then a scaling operation is performed. As the top-left and the bottom-right coordinates of the page are given in the XDOC coordinate system, the width and the height of the document in the XDOC system can be determined.

In one embodiment, the top, left, right and bottom boundaries of text zones (described in more detail below) and image zones are directly expressed in the OCR software output (or in the processing output for the subzones). These are translated into the image pixel coordinate system (as described above). As for text lines, the OCR software only provides the Y coordinate of the baseline, as well as the left and right X coordinates. Using the font information (height of uppercase letters, height of lowercase letters with descenders and without descenders) and the recognized text (uppercase or lowercase letters, with or without descenders), the top and bottom boundaries of the line are determined. For robustness to character recognition failures, a variant would be not to consider the recognized characters and only use the uppercase letter height for the top boundary and the lowercase with descenders height for the bottom boundary. Once the line boundaries have been determined, the coordinates are transformed and rectangles are determined and drawn in the same way as image and text zones.

Figure 3:
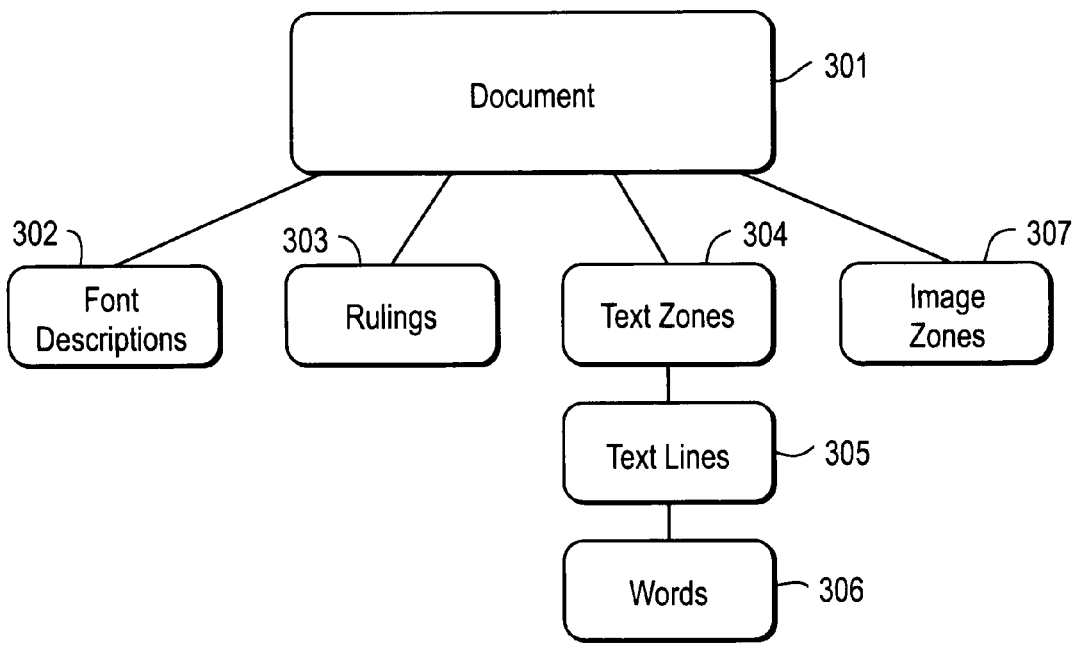
FIG. 3 illustrates an exemplary data structure.

In one embodiment, in order to manipulate the information more easily, the information is reorganized into a hierarchical data structure, such as the exemplary structure shown in FIG. 3. The boxes in FIG. 3 include document 301, font descriptions 302, rulings 303, text zones 304, text lines 305, words 306 and image zones 307.

Determining Character Size

The character size information from the layout information may need to be converted into a statistic for use before attribute assignment. Depending on the application, several conversions may be used.

In one embodiment, the scaling factor for a text zone is determined using the size of the character set (or font). In one embodiment, in order to determine the largest character set size for the text zone being processed, processing logic determines the arithmetic mean of the average width and height of the character set (all individual characters, fonts). This may be represented as follows:

$$\text{char\_size} = \max_{character\ set}((\text{<height>} + \text{<width>})/2)$$

The geometric mean may be used as well. In another embodiments, the smallest font size is used, or an average is used. In one embodiment, only the biggest character set size in the zone is used. That is, the scaling factor attribute is computed for each zone with the biggest font in this zone. Alternatively, the bounding box of each character or the height of the bounding box of each word or line or an estimated font size in points may be used. Also average width or average height may be used.

Segmentation into Zones for Reformatting

After obtaining the layout analysis information, processing logic may also perform zone segmentation. This is because the text zones identified by the OCR process may be very large or consist of all the text in the document. In one embodiment, processing logic performs zone segmentation by creating objects that consist of a few textlines related by common features (font or alignment) and spatial proximity.

Figure 4:
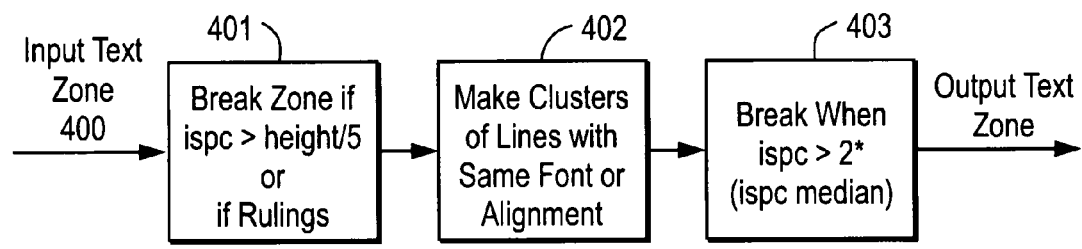
FIG. 4 illustrates a flow diagram of one embodiment of a zone segmentation process.

One embodiment of a process for determining zones with appropriate groupings of text lines is set forth in FIG. 4 and such objects are referred to herein as text zones. Referring to FIG. 4, ispc represents interspace (the space between lines, calculated using bounding boxes) and height represents the height of the document. The segmentation process begins with processing logic determining for a text zone, such as text zone 400, whether or not to break the text zone. In one embodiment, processing logic breaks the text zone if the interspace (ispc) is greater than the height of the document (height) divided by five or if the zone is identified as a ruling (processing block 401). Processing logic then makes clusters of lines with the same font or alignment (processing block 402). In alternative embodiments, processing logic makes clusters based on font only or alignment only.

Another alternate is to use only boundary boxes for text lines. Next, processing logic breaks a text zone when the interspace (ispc) is greater than the product of a predetermined number (e.g., two) times the median interspace (ispc median) (processing block 403).

Similarly if layout analysis software outputs individual text lines without grouping them into zones, lines with similar properties can be grouped into zones.

Alignment Type

In one embodiment, an alignment type is already determined by the OCR processing. However, because it may not be accurate or it may only considers alignment with respect to the entire page, and not the alignment of the text lines in the subzone (which will be useful for the reflow process described herein), processing logic re-assesses the alignment type for each subzone. In one embodiment, the re-assessment is performed by calculating the standard deviation of the center, the left edge and the right edge of the textlines in the subzone, and taking the axis with the lowest standard deviation as the alignment type.

One Embodiment of Reflow

In one embodiment, the text to be reflown is represented by a list of objects of the class referred to as textline. This list of textline objects contains the information about the text in the original document (bounding boxes of lines and words, fonts, OCRed text, attributes) but not the image data. This list of textline objects is referred to herein as old_textlines. The analysis stage of the reflow computation outputs a new list of textline objects that are referred to herein as reflown_textlines. This new list describes the reflow as new locations for bounding boxes. In addition, the textline objects in reflown_textlines contain a mapping between the old lines and the reflow lines. This mapping consists of a series of matches between fragments (subunits of lines) of the reflown lines and the corresponding fragments of the old lines. For each textline object in reflown_textlines, reflow instructions are a list of 5-uplets, that describe one of these matches in the following manner:

Reflow instruction/mapping=(reflown_start, reflown_end, old_line, old_start, old_end) with:

1) reflown_start, reflown_end: first word and last word of the fragment, given by their numerical position in the reflown textline object's list of words;

2) old_line: numerical position (in the old_textlines list) of the textline where the fragment comes from; and 3) old_start, old_end: first word and last word of the fragment, given by their numerical position in the original textline object's list of words.

Figure 5:
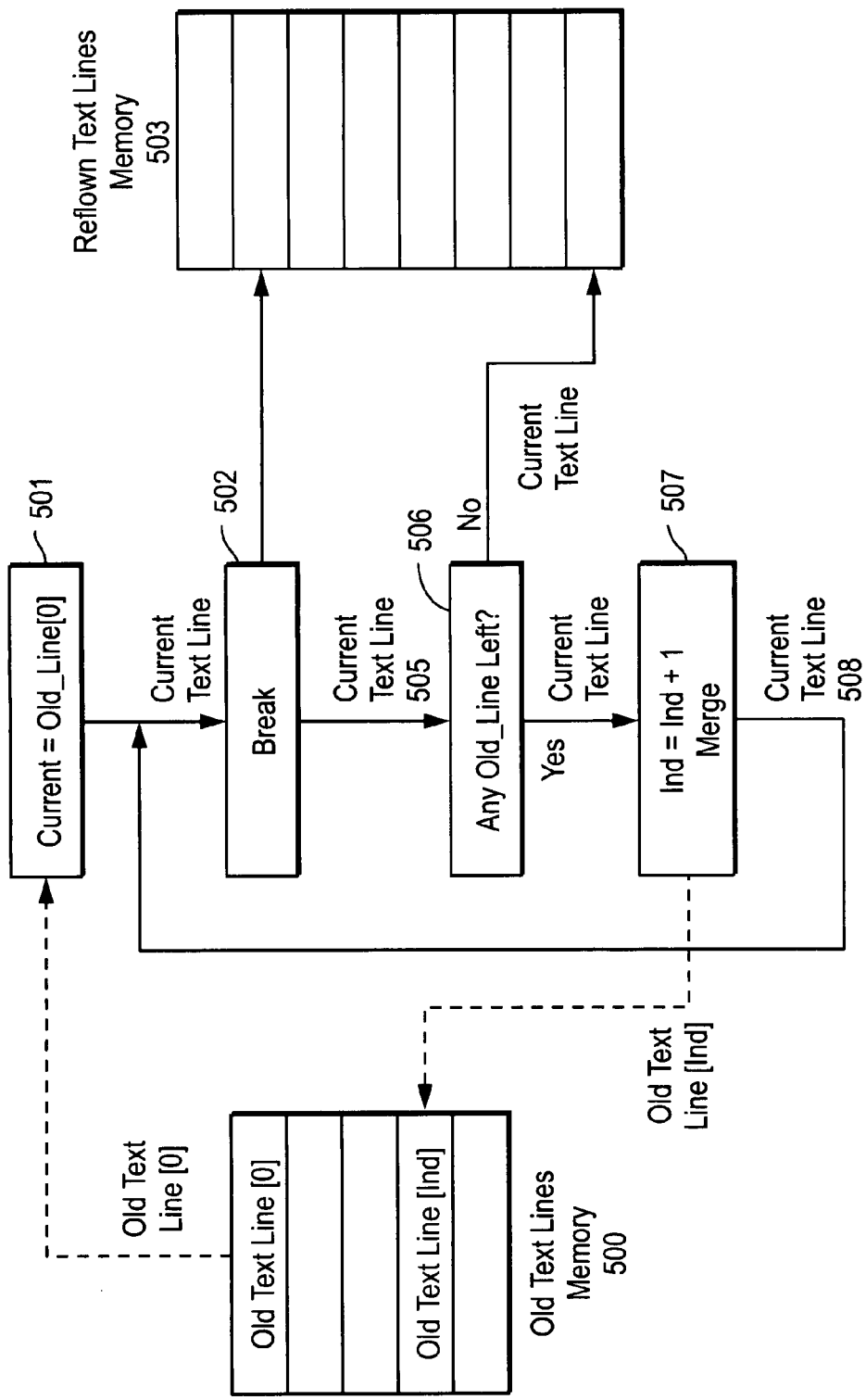
FIG. 5 is a flow diagram of one embodiment of a reflow process.

An exemplary analysis data flow is shown on FIG. 5. It is a loop that handles a textline object referred to herein as current_textline, which is the description of a text line after reflow. Referring to FIG. 5, processing logic initially creates the current_textline by copying the first line of old_textline, which is stored in the old text lines memory 500 and compares its bounding box with the display constraints (processing block 501). Then, if necessary, processing logic breaks the current_textline to fit in the constrained width (processing block 502). The last fragment (after the break) becomes the new current_textline 505, while the other fragments (before the break) are stored as the beginning of the reflown_textlines list in the reflown_text lines memory 503. If no break was required, the whole current_textline is stored in reflown textlines. Thereafter, processing logic determines if there are any old_textlines left in old text line memory 500 (processing block 506). If not, then processing logic stores the current text line into the reflown text lines memory 503 after the previously stored reflown text line, which is at the end of the reflown text lines memory 503. If so, processing logic merges the current_textline 505 with the following line in the old_textlines memory 500 (processing block 507). The resulting line is the new current_textline 508, which is feed back to the top of the loop. The loop continues until there are no more lines in the old_textlines memory 500 to feed into the loop. During these operations, the correspondence between the text of the reflown lines and the one of the old lines is recorded in the fragments list, as described below.

Exemplary Results

Figure 6:
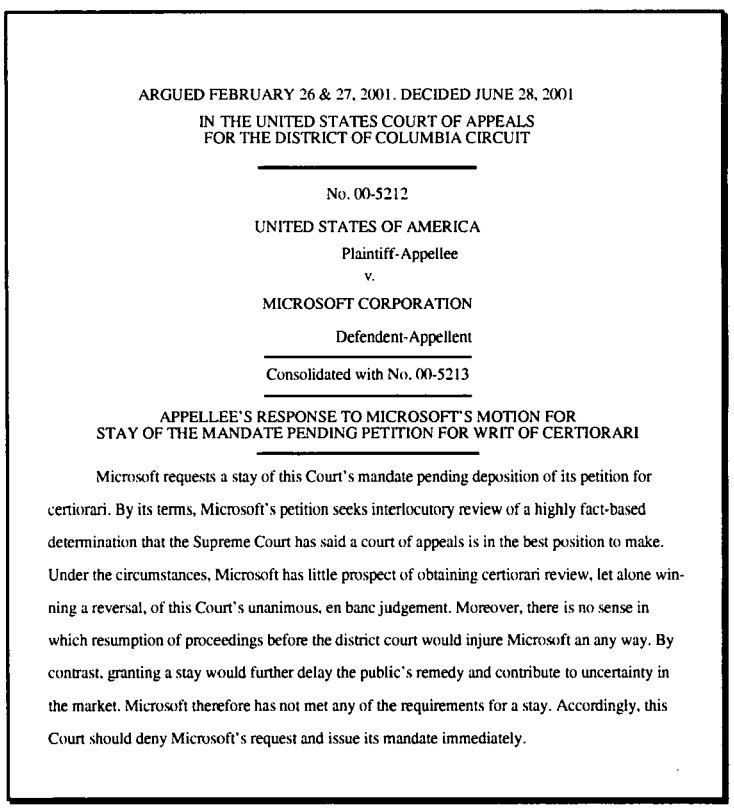
FIG. 6 illustrates an original scanned document.
Figure 7:
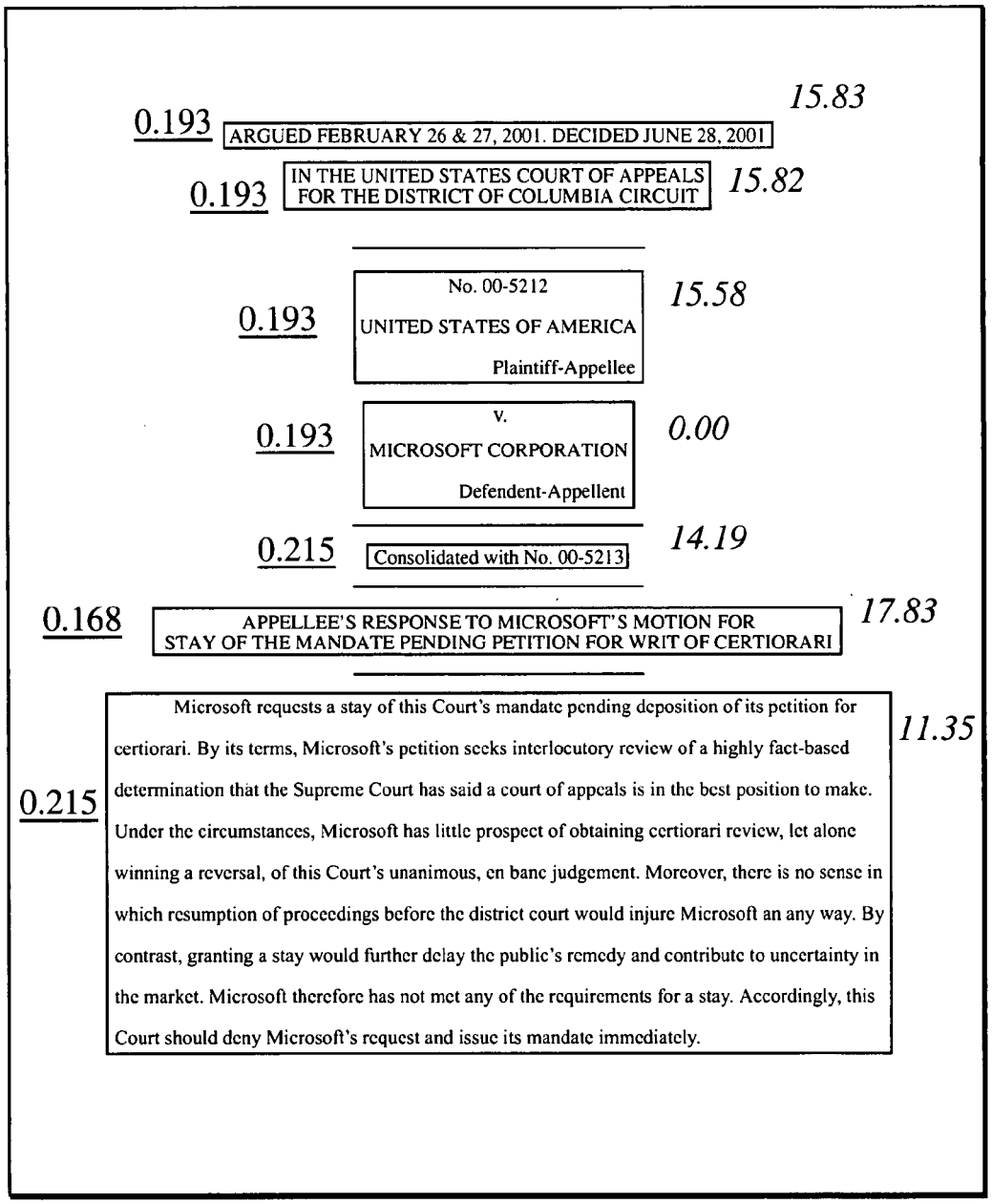
FIG. 7 illustrates text zone boundaries for the scanned document of FIG. 6.

FIG. 6 illustrates a specific scanned document. FIG. 7 illustrates text zone boundaries for the document in FIG. 6. Referring to FIG. 7, the scaling factors (underlined numbers) and importance values (numbers in italic) computed for each zone are shown. The coordinates of the text zone rectangular boundaries are in pixel coordinates and are drawn. To obtain these coordinates from the XDOC coordinates obtained after parsing the OCR information, scaling and performing an inverse de-skewing transform, was performed.

Figure 8:
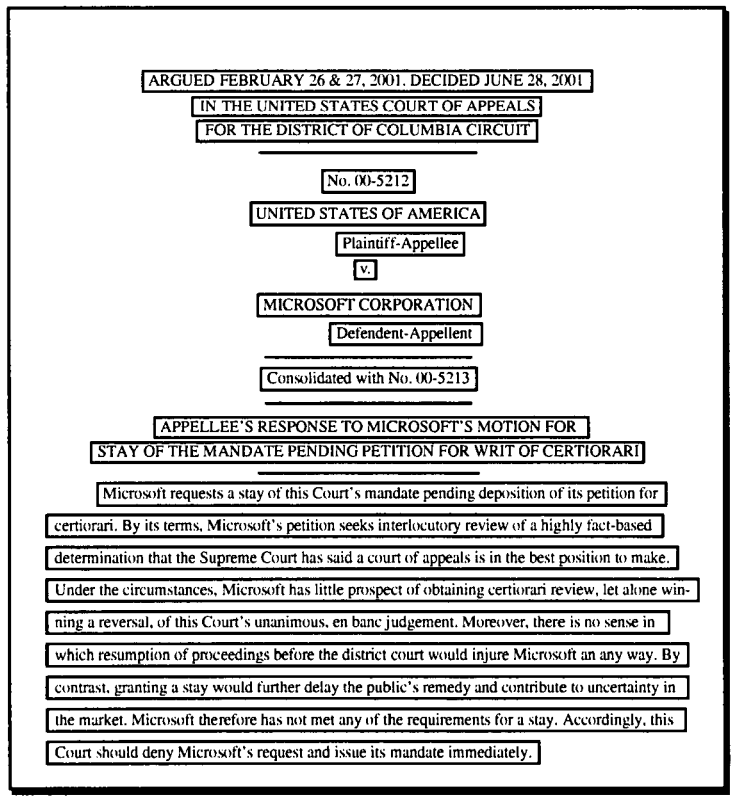
FIG. 8 illustrates text line boundaries for the scanned document of FIG. 6.

FIG. 8 illustrates text line boundaries. In one embodiment, to derive the text line boundaries, processing logic derives the XDOC coordinates from the OCR output information and then applies the same operations to obtain the pixel coordinates.

FIGS. 9 and 10 show an exemplary zone in a document and the zone after reflow has been applied, respectively. Note that the reflow process not only reflows the text, but may also reduces whitespace in this case.

FIG. 11 illustrates an exemplary constrained display document representation using selection and deletion of text zones, positioning and reflow.

Browsing Documents

The constrained display document representations generated according to the teachings herein may be used to enable a user to browse a set of documents and select documents that the user wishes to retrieve. The constrained display document representations can then function as icons that provide some key text to the user. In one embodiment, these constrained display document representations may operate as buttons to retrieve a document (e.g., scanned or PDF documents). In a browsing scenario, where many constrained display document representations or thumbnails are displayed in a window for a user to retrieve the document he wishes, constrained display document representations may be used in many ways. For example, there may be standalone constrained display document representations where the user sees only the constrained display document representations to retrieve his document. In one embodiment, the user may be able to switch to thumbnails if desired, and if such an option is available.

In another example, a combination of constrained display document representations and thumbnails may be used. In one such instance, the user sees both thumbnails and constrained display document representations, next to each other, or the constrained display document representations only as a pop-up when the cursor control device (e.g., mouse) enters the region for the document.

In still another use, an automated choice may be provided by the browser to display a constrained display document representation or a regular thumbnail. In one embodiment, the constrained display document representation generation process may determine if a document has such a rich pictorial layout that a regular thumbnail is better.

In yet still another use, on a thumbnail browser, when the user moves a cursor over a text zone using cursor control device, the text of the zone appears in a side-window. In one embodiment, a document management system such as an eCabinet of Ricoh Corporation of West Caldwell, N.J., may use the OCR to perform a keyword search to identify a document. However, if the keyword search has produced results that have a low confidence value, then the constrained display document representation may be used to help the user identify the document the user is searching for.

Similarly, for multi-function peripherals (MFPs) or other devices having a small display that would not be capable of showing an entire document, the teachings described herein may be used to provide a visual indication of documents stored and/or accessible through the device.

Combination with Other Analysis Methods

Figure 13:
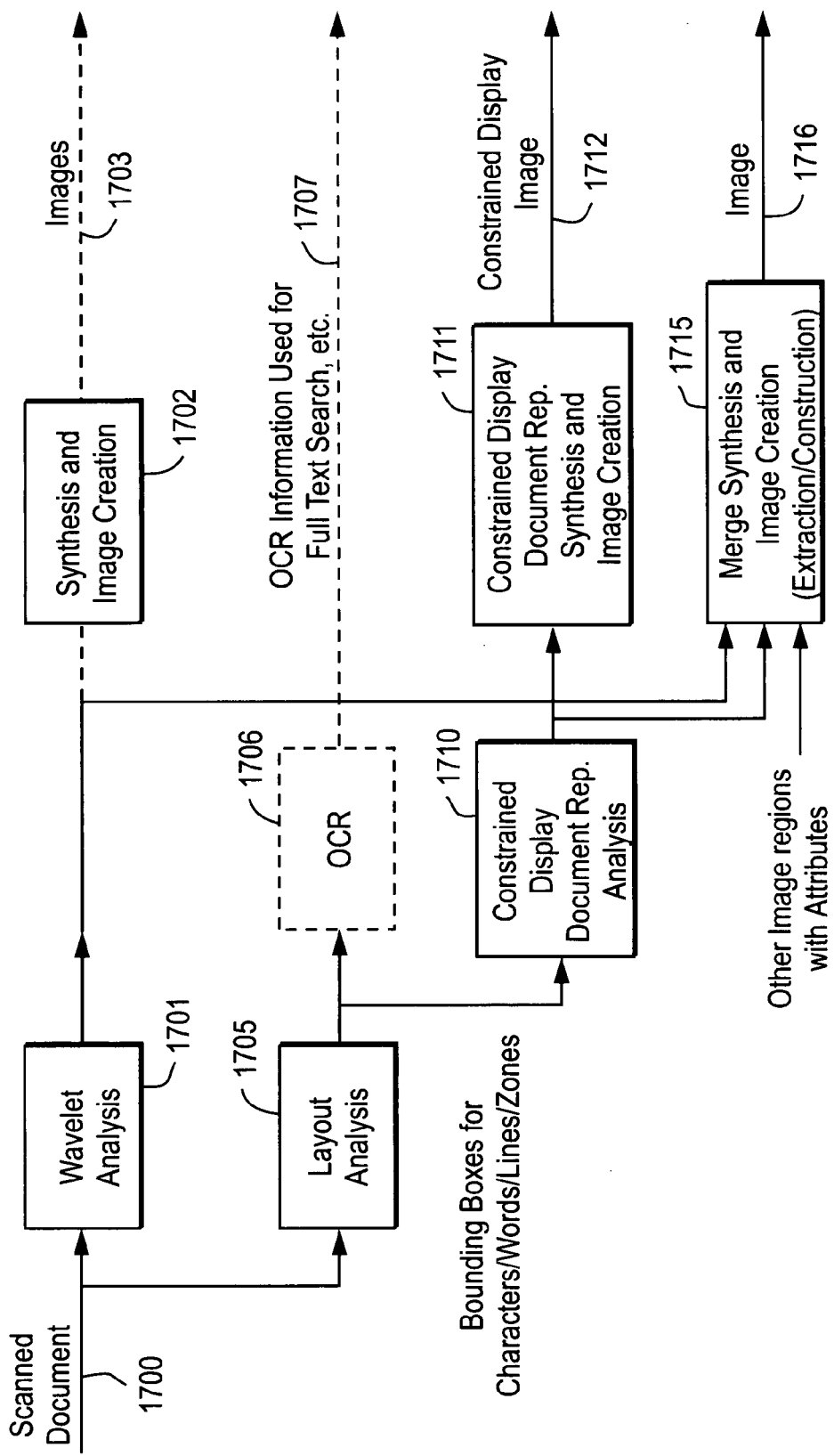
FIG. 13 is a block diagram of a system capable of generating a constrained display document representation and a multiresolution segmentation image.

The analysis output 130 described above for FIG. 1, can be combined with other analysis. FIG. 13 is a flow diagram of one embodiment of a system incorporating constrained display document representation generation with another type of image generation and is described in greater detail below.

Referring to FIG. 13, a scanned document 1700 is input into wavelet analysis 1701, which performs wavelet analysis on scanned document 1700. The results of the wavelet analysis are processed by synthesis and image creation 1702 to produce images 1703. For more information on wavelet analysis 1701 and synthesis and image creation 1702, see U.S. patent application Ser. No. 10/044,420, entitled "Header-Based Processing of Images Compressed Using Multi-Scale Transforms", filed Jan. 10, 2002, and U.S. patent application Ser. No. 10/044,603, entitled "Content and Display Device Dependent Creation of Smaller Representations of Images", filed Jan. 10, 2002, both assigned to the corporate assignee of the present invention and incorporated herein by reference.

Scanned document 1700 is also input into layout analysis 1705, which identifies bounding boxes, such as, for example, bounding boxes for characters, words, lines, zones, as described above. This information is output from layout analysis 1705 to OCR 1706, which performs OCR to generate OCR information 1707. OCR information 1707 may be used for a full text search, automatic keyword extraction, etc.

The information output from layout analysis 1705 (image analysis output) is also output to constrained display document representation analysis 1700 (text analysis output), which operates as described above in conjunction with synthesis and image creation 1711 to generate constrained display image 1712.

The outputs of both wavelet analysis 1702 and constrained display document representation analysis 1710 are input to Merge, Synthesis & Image Creation block 1715 where image 1716 is generated. One embodiment of how image 1716 is generated is given below.

Merging of J2K-Based Output with Constrained Display Image Representation Output In order to merge the wavelet analysis output for a scanned document, multiresolution segmentation data (e.g., computed by a MAP algorithm) and a multiresolution entropy distribution has to be available. For more information, see U.S. patent application Ser. No. 10/044,420, entitled "Header-Based Processing of Images Compressed Using Multi-Scale Transforms", filed Jan. 10, 2002, assigned to the corporate assignee of the present invention, and incorporated herein by reference.

Next, a Connected Component Analysis is performed on the output of the multiresolution segmentation. This may be performed using a function call "bwlable" in Matlab (The Mathworks, Inc.) to produce connected neighborhoods. Connected Component analysis is well-known in the art. The output is a list of connected components along with their locations.

Attributes per component are obtained. In one embodiment, this includes the resolution of the image component as determined in the segmentation map, the x and y locations and the x and y dimensions of the smallest rectangle that contains the component, and its importance value, i.e., the number of bits used to code the component at its resolution.

Once the constrained display analysis output is obtained, the component image of text zones is created.

In one embodiment, first, a component map at code block resolution for the text zones is created. The dimensions of a rectangle at code block resolution corresponding to a text zone of dimensions (x,y) is given by, $$x_r = \lceil x/x_{cb} \rceil$$

$$y_r = \lceil y/y_{cb} \rceil$$

where $x_{cb}$ and $y_{cb}$ are the codeblock dimensions.

In the next step, a new component list is derived by merging the image with the text components. For each image component, a check is made as to whether it overlaps with any of the text components. In one embodiment, the overlap is calculated as the number of overlapping pixels between a text and an image component divided by the maximum of the number of pixels in the image component and the text component. If an image component and a text component overlap, a more detailed analysis of the overlap is performed.

If there is no overlap, the image component is added to the merged component list.

If there is an overlap, a check is made as to whether the sum of overlap for the image component with all text components is smaller than a threshold $T_1$ (e.g., 0.3) or greater than a threshold $T_2$ (e.g., 0.7). In this case, the image component is considered to be significant. The total area of the union between the image component and all of its overlapping text components is added as a component to the merged component list. Its resolution attribute is that of the original image component.

If the sum of overlap with all text components is greater than $T_1$, but smaller than $T_2$, then the image component is considered to have a significant portion of text in it and also a significant portion of non-text in it. In this case, the text components that have a significant overlap (greater than a threshold $T_3$ (e.g., 0.25)) with the image component are subtracted from the image component. The result, the difference image, may be one connected component with holes or several smaller connected components. In order to determine the number of connected components in the difference image, a connected component analysis is performed on it. The result is a collection of image components that do not have any significant overlap with text components any longer. This collection is added to the merged component list. Its resolution attribute is that of the original image component.

In a last step, all the text components are added to the merged component list including their original attributes (resolution and importance) from the constrained display document representation analysis.

Once the merged components have been created, attributes need to be assigned. These attributes are the same ones as described above. The merged component list is a mixture of image and text components plus attributes. Whereas the resolution attribute has been already assigned during the merging of component images the importance value still needs to be assigned to the components in the merged component list.

An example a metric for the importance of merged components that has a goal of merging the importance values for text and image components follows:

$V_1$=percentage of labeled component pixels in including rectangle $V_2$=cumulative entropy at component image resolution in including rectangle $V_3$=importance from analysis of layout for text components; $V_3$=0 for image components $$\text{importance\_of\_merged\_component} = \alpha \cdot \frac{V_1 \cdot V_2}{N_1} + (1-\alpha) \cdot \frac{V_3}{N_3}$$

$\alpha$=1 for image component
$\alpha$=0 for text component

An alternative importance value for merged components may be obtained as follows:

$$\alpha \cdot \frac{V_1 \cdot V_2}{N_1} + \beta \cdot \frac{V_3}{N_3}$$

where
$\alpha$=0.7 and $\beta$=0.5
Choices for $N_1$: *total cumulative entropy
*(total cumulative entropy) (size of component)
$N_3$: *(image area)·□
*(relative importance of text component to sum of importance of all text component)·□
Examples for thresholds include the following:
thresh1=0.4
thresh2=0.7
thresh3=0.04
□=5000

The □ value may be computed adaptively, e.g., □=const·(percentage_of_coverage_of_document_with_text_zones)

Logical Description

A mathematical description of the merging of components is described in the following.

$T_m$=text component, m=1, ..., M
$I_n$=image component, n=1, ..., N
A(C)=number of labeled pixels in component C
R(C)=smallest rectangle that includes the component C Since the original text boxes have rectangular shape it follows that $A(T_m)=A(R(T_m))$, but in general $A(I_n) \neq A(R(I_n))$.

The overlap of a text and an image component is defined as $\text{overlap}(I_n, T_m) = \min$ $$\left( \frac{A(I_n \cap T_m)}{A(T_m)}, \frac{A(I_n \cap T_m)}{A(I_n)} \right)$$

A difference image between an image and a text component is defined as:

$$I_n(x,y) - T_m(x,y) = \begin{bmatrix} I_n(x,y) & \text{if } T_m(x,y) = 0 \\ 0 & \text{if } T_m(x,y) > 0 \end{bmatrix}$$

For exemplary pseudo code is given below:

```
for n=1,...,N
    for m = 1,...,M
        compute overlap(I_n,T_m)
    end
    if(Σ_m overlap(I_n,T_m)> 0)
        if(Σ_m overlap(I_n,T_m) < thresh1 || Σ_m overlap(I_n,T_m) > thresh2 )
            tmpimage = I_n
            number_of_separated_text_components = 0
            for m = 1, ... M
                if(overlap(I_n,T_m)>thresh3)
                    tmpImage = tmpImage - (I_n-T_m)
                    number_of_separated_text_components++
                end
            end
            if(number_of_separated_text_components > 0)
                perform connected component analysis on tmpImage
                add components to merged list
            else
                add [I_n ∪ {T_m, m=1,... M | overlap(I_n,T_m)> 0)] to
                merged list
            end
        end
        else
            add [I_n ∪ {T_m, m=1,... M | overlap(I_n,T_m)> 0)] to
            merged list
        end
    else
        add original component I_n to merged list
    end
end
for m = 1,...,M
    add original component T_m to merged list
end
```

Figure 14:
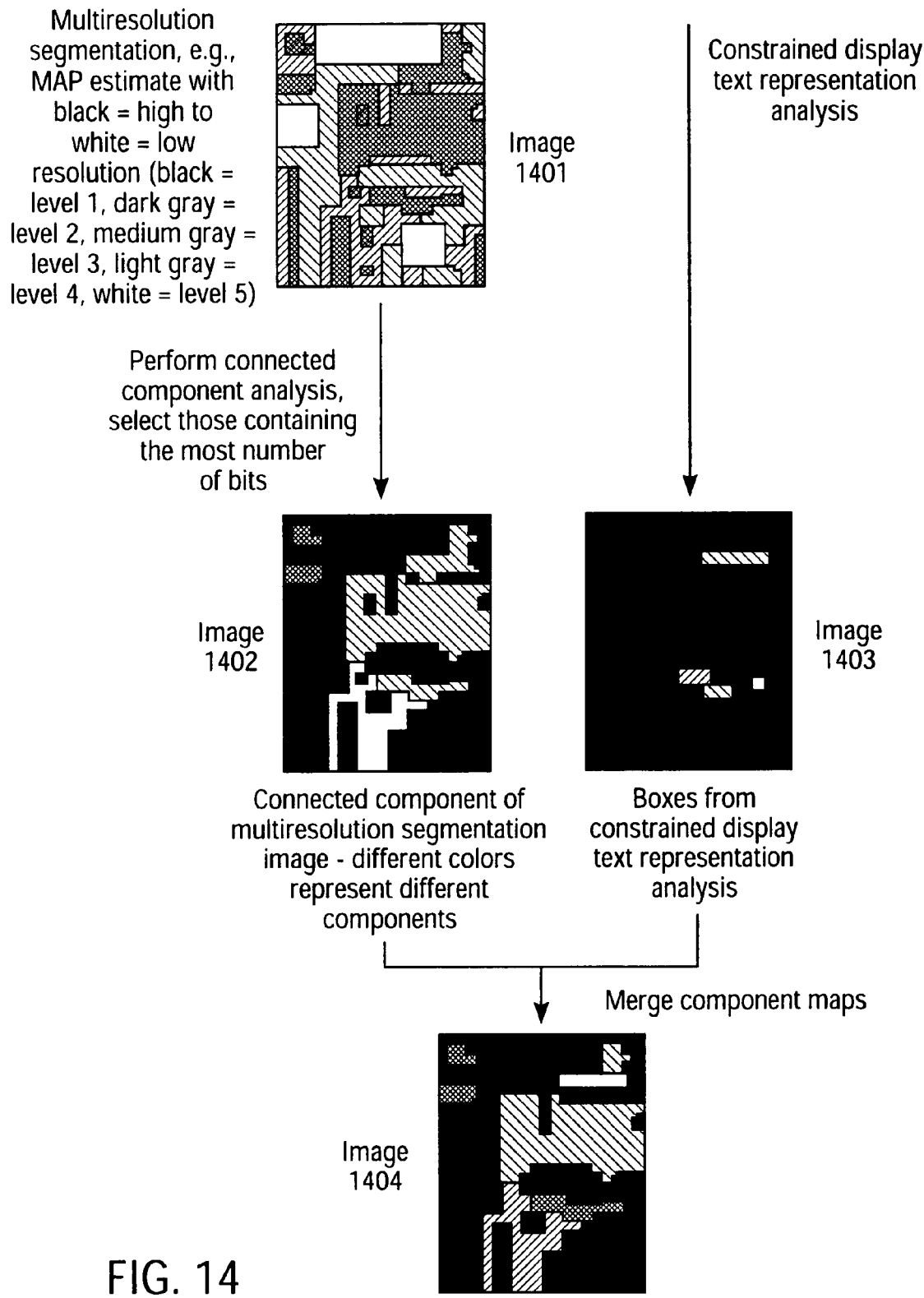
FIG. 14 illustrates an example of merging multiresolution image segmentation data with boxes from constrained display text representation analysis.

FIG. 14 illustrates an example of merging multiresolution image segmentation data with boxes from the constrained display text representation analysis. Referring to FIG. 14, image 1401 illustrates the multiresolution segmentation image. In image 1401, the multiresolution segmentation is shown as a MAP estimate with black=high to white=low resolution (black=level 1, dark grey=level 2, medium grey=level 3, light grey=level 4, white=level 5). After performing connected component analysis and selecting those containing the most number of bits, image 1402 is generated and represents connected components of a multiresolution segmentation image. The different colors represent the different components. Separately, a constrained display text representation analysis is performed and produces component image 1403 which show zones from the constrained display text representation analysis at codeblock resolution. The component images 1402 and 1403 are merged to create image 1404.

Figure 15:
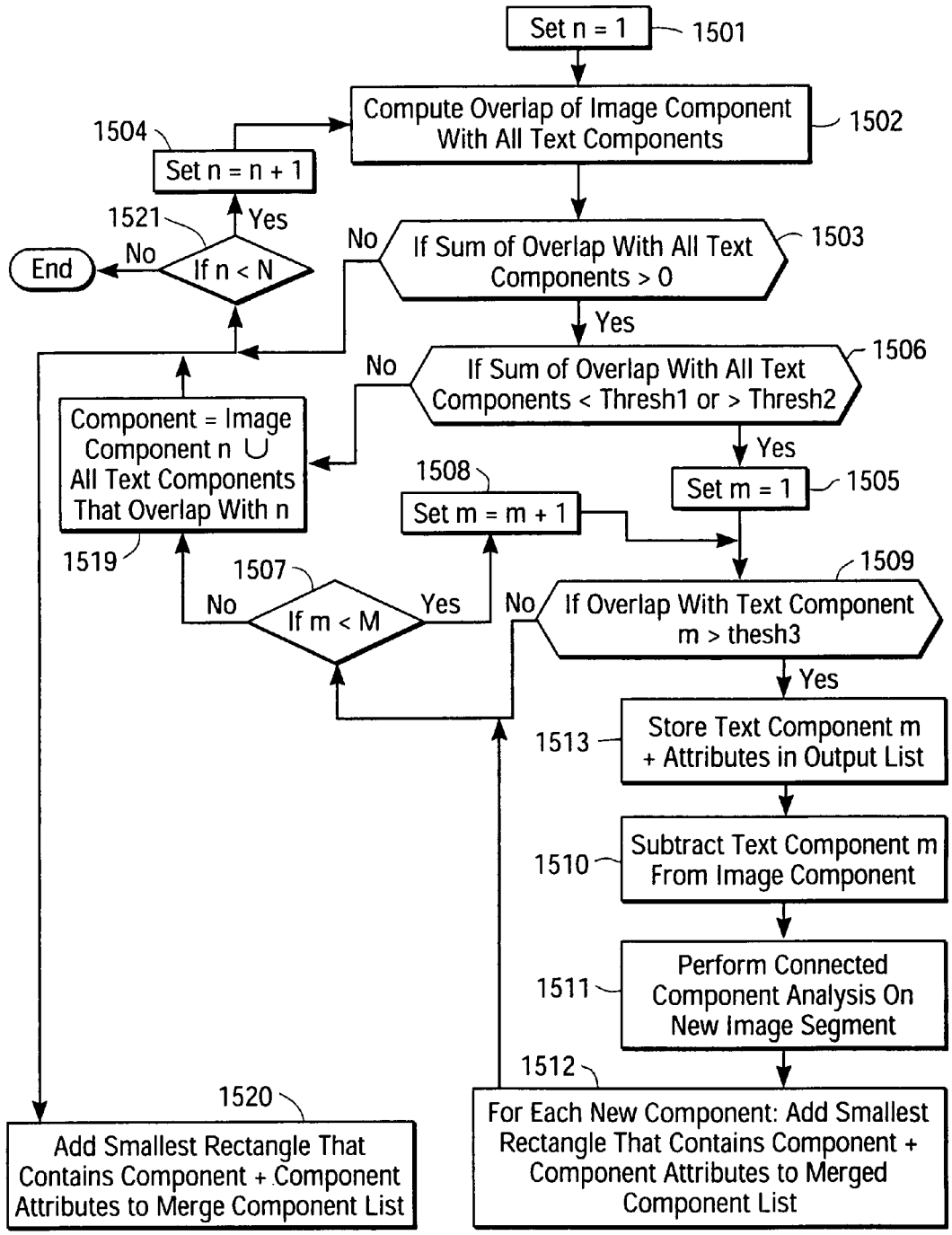
FIG. 15 is a flow diagram of one embodiment of a process for merging multiresolutional image segmentation data with boxes from constrained display text representation analysis.

FIG. 15 is a flow diagram of one embodiment of the process for merging multiresolution image segmentation data with boxes from constrained display text representation analysis. Each of the boxes if the processing logic which may comprise hardware (e.g., circuitry, dedicated logic, etc.), software (such as run on a general purpose processor or a dedicated machine), or a combination of both.

Referring to FIG. 15, processing logic initially sets available n=1 (processing block 1501). Next, processing logic computes the overlap of image component n with all text components (processing block 1502). Processing logic then tests whether the sum of the overlap with all text components is greater than zero (processing block 1503). If not, processing logic adds the smallest rectangle that contains the processing component attributes to the merge component list (processing block 1520) and processing logic tests whether n is less than N, the total number of image components (processing block 1521). If so, processing logic increments n (processing block 1504) and processing transitions back to processing block 1502. If not, then the process ends.

If the sum of the overlap of text components is greater than threshold, processing logic transitions the processing block 1506 where processing logic tests whether the overlap with all text component is less than a first threshold (thresh1) and greater than a second threshold (thresh2). If not, processing logic sets the component equal to the union of the image component and all text components that overlap with n (processing block 1519) and processing logic transitions back to processing blocks 1520 and 1520.

If the overlap with all text components is greater than thresh2 and less than thresh1, processing transitions to processing block 1505 where processing logic sets a variable m equal to one. Thereafter, processing logic tests whether the overlap with text component m is greater than another threshold, thresh3 (processing block 1509). If not, processing logic transitions to processing block 1507 where processing logic tests whether the variable m is less than the total number of text components, M. If not, processing transitions to processing block 1520. If so, processing transitions to processing block 1508 where the variable m is incremented by one and then processing transitions back to processing block 1509. If not, processing transitions to processing block 1519.

If the overlap with text component M is greater than the threshold thresh3, processing logic transitions to processing block 1513 where processing logic stores text component m and attributes in an output list. Next, at processing block 1510, processing logic subtracts the text from component m from the image component n.

Then, processing logic performs a connected component analysis of the new image segment (processing block 1511) and for each new components, processing logic adds the smallest rectangle that contains the component attributes to store the merged component list (processing block 1512).

Storing Constrained Display Document Representation in Files

Storing Constrained Display Document Representations in JPEG Files

Many file formats contain methods to store both the image of document pages and a separate icon. For example, JPEG compressed images are typically stored in either the JFIF file format or the Exif file format. Both of these file formats allow storage of an icon that is encoded independently from the main image. Typically, these thumbnails are created by sub-sampling the original image, but there is no requirement to obtain them this way. Thus, the output of the constrained display document representation generation process can be encoded and stored in a JFIF or Exif file. Devices like digital cameras or PDAs often decode just the thumbnail for display, and would thus show the constrained display document representation automatically. When the user asks to open the file or to zoom in on part of the file, the devices decode the full image and show a portion on the display. This is exactly the desired response.

Storing Thumbnails in JPM Files

For a document storage system, file formats which store multiple pages like PDF and JPM (as defined by JPEG 2000 Part 6) are more useful than JFIF on Exif. Some formats provide multiple ways of storing thumbnail images. Some of these are more efficient than typical thumbnails because of the ability to reuse image data. Some methods provide additional document capabilities.

JPM files are made up of "boxes" which are simply a range of bytes within the file with a specified type and a length. The content of each box is usually either a set of boxes (with type and length information) or a set of "objects" which might be coded image data or metadata or layout information. Often a decoder can use the length and type information to quickly find the boxes of interest and skip the boxes that are unneeded or even not understood by the decoder. JPM files contain some boxes designed to organize the pages with the file.

JPM files contain other boxes designed to store layout information for a single page. While a page might be defined in JPM by a single JPEG or JPEG 2000 file, more commonly it is defined as sequences of image and mask objects that must be positioned and composited. Finally, JPM files contain boxes that store coded image data. These are the images that are composited to form a page. JPM provides boxes to share this coded data for many different objects.

The simplest JPM file contains just one page and just a solid rectangle of color filling the page. An example file that contains a JPEG 2000 compressed image for the page looks like:

```
JPEG 2000 Signature box
File Type box
Compound Image Header box
Page Collection box
    Page Collection Locator box
    Page Table box
Page Box
    Page Header box
    Layout Object box
        Layout Object Header box
        Object box
            Object Header box
            JP2 Header box
                Image Header box
Contiguous Codestream box
```

In the above example, and other examples given herein, the level of indentation indicates the nesting of boxes in the file.

A complete explanation of all of the boxes is given in JPEG 2000 Part 6. (Information Technology—JPEG 2000 Image Coding Standard—Part 6: Compunt Image File Format," ISO/IEC FDIS 15444-6.) Briefly, the signature box just identifies the file as being in the JPEG 2000 family of file formats. Because many of the JPEG 2000 file formats are compatible, the file type box indicates what other file format readers can obtain useful data from this file. The compound image header box contains several fields useful for a JPM decoder (e.g., number of pages in the file, profile of the file, location of some structure boxes within the file). There can be multiple Page Collection boxes. These boxes provide pointers to allow for locating all the page boxes in a document. They are a key to allowing orderly navigation between pages in a document. The page collection locator box is essentially a pointer back to the page collection box that contains the current page collection if this is not a top level page collection box. The page table box contains pointers to pages boxes.

The page box contains information about a single page. The page header box specifies the size and orientation of a page, the number of objects and a background color. There is one layout object box for each object (mask and image) pair to be composited on the page. It contains a layout object header box, which provides the size of the layout object and an Identifier number indicating the order to layout the objects. The object header box contains a pointer to the Contiguous Codestream box (it contains an 8 byte offset and a 4-byte length field). The pointer could be used to point to a codestream in another file, but there would need to be an additional data reference box in this file.

The image data is stored in the Contiguous Codestream box in JPEG 2000 format.

One Thumbnail for the Entire File

To store an icon for the entire document, a JP2 Header box can be added at the file level. When the JP2 Header box is added, the first Contiguous Codestream box in the file will be used as the thumbnail. This thumbnail could be equivalent to the codestream used to represent the entire page. Alternatively, a second codestream could be added for the icon. If a second codestream is added the file might look like (new boxes are underlined):

```
JPEG 2000 Signature box
File Type box
JP2 Header box
    Image Header box
Compound Image Header box
Contiguous Codestream box (for thumbnail)
Page Collection box
    Page Collection Locator box
    Page Table box
Page Box
    Page Header box
    Layout Object box
        Layout Object Header box
            ID=1
        Object box
            Object Header box
            JP2 Header box
                Image Header box
Contiguous Codestream box for Object
```

There is no requirement for the size of the thumbnail to, in any way, be related to the main image size. For a document with multiple pages, it might even be larger than a single page and contain elements from more than one page.

Thumbnails for Each Page as a Separate Layout Object

It is possible to create a file with no "document" thumbnail, but with a thumbnail for each of the two pages. This makes use of a provision in the JPM standard that objects with a Layout Identifier of zero are to be used as thumbnails and not composited into the page. Items associated with these two thumbnails have been underlined.

```
JPEG 2000 Signature box
File Type box
Compound Image Header box
Page Collection box
    Page Collection Locator box
    Page Table box
Page Box
    Page Header box
    Layout Object box
        Layout Object Header box
            ID=0
```
```
        Object box
            Object Header box
                OFFSET points to Contiguous Codestream #1
            JP2 Header box
                Image Header box
    Layout Object box
        Layout Object Header box
            ID=1
        Object box
            Object Header box
                OFFSET points to Contiguous Codestream #2
            JP2 Header box
                Image Header box
Contiguous Codestream box #1
Page Box
    Page Header box
    Layout Object box
        Layout Object Header box
            ID=0
        Object box
            Object Header box
                OFFSET points to Contiguous Codestream #3
            JP2 Header box
                Image Header box
    Layout Object box
        Layout Object Header box
            ID=1
        Object box
            Object Header box
                OFFSET points to Contiguous Codestream #4
            JP2 Header box
                Image Header box
Contiguous Codestream box #3
Contiguous Codestream box #2
Contiguous Codestream box #4
```

The layout objects with identifier 0 and their associated codestreams will not be composited into the page, instead they are used as representations for the page without decoding/rendering the entire page. When the page is rendered at full size, the layout objects with identifiers other than 0 are used. In order to put the thumbnails closer to the beginning of the file (codestreams 1 and 3), this example has the full page codestreams (codestreams 2 and 4) moved to the end.

Of course, many other possibilities exist for the arrangement of boxes, and inclusion of additional boxes for other purposes.

Thumbnails Stored as a Separate Page Reusing Layout Objects

Figure 16:
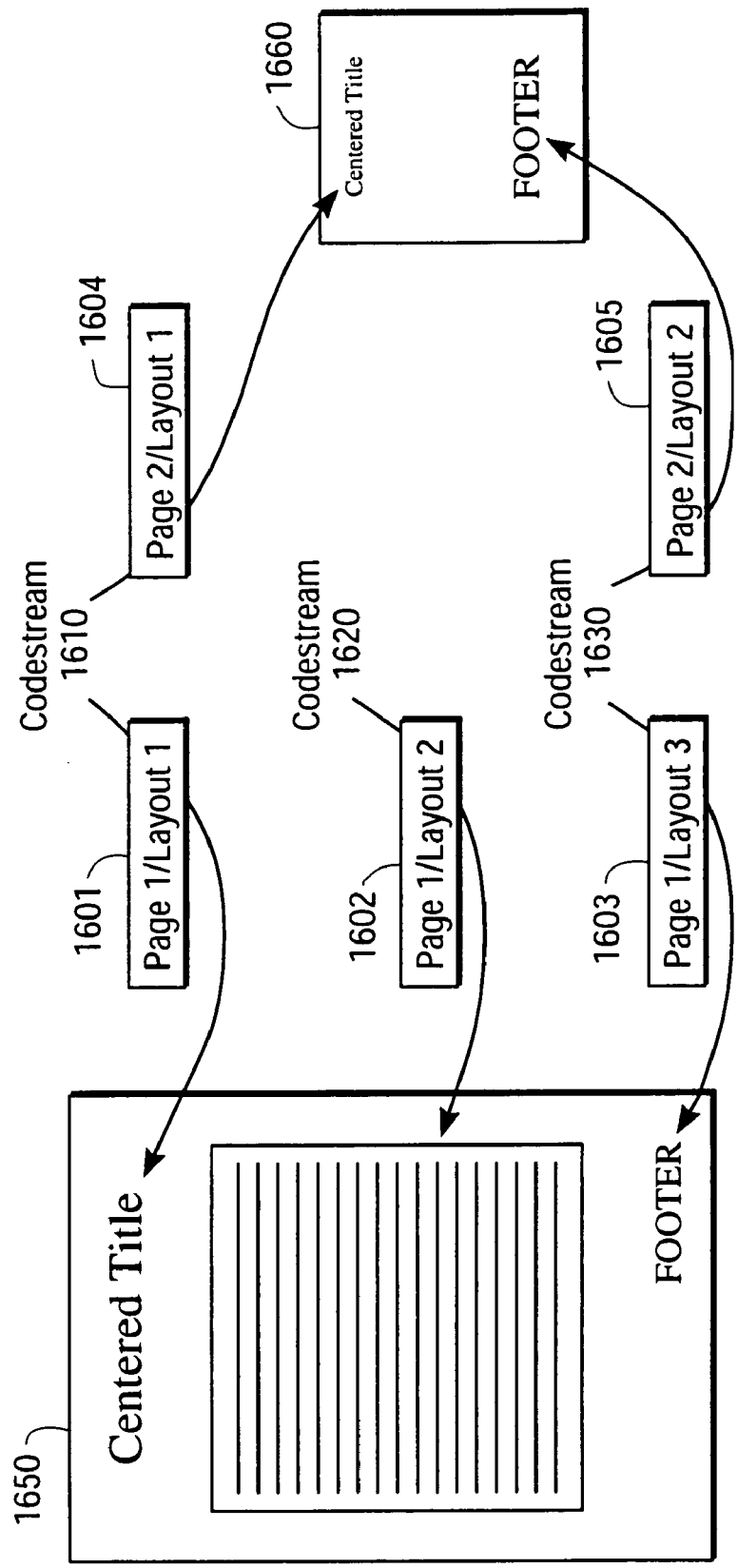
FIG. 16 illustrates decoding different page images from the same codestreams.

For pages made up of several layout objects (perhaps each text region or even each word has its own layout object), a few of the layout objects can be selected and scaled for a thumbnail. The file below describes an 8½ by 11 inch page at 200 dpi, with 3 objects on it, stored in separate codestreams. A "thumbnail" is stored as a separate page with a display size of just 220 by 170 samples. Two of the objects from the main page are included in the thumbnail page, but the other object has been deleted for space reasons. One of the objects is scaled by a factor of 10 and thus fills the same relative amount of the thumbnail as it did on the original page. Another of the objects has been reduced by a factor of 5, and thus appears relatively larger on the thumbnail than it does on the main page. This might be done because the text is predicted to be unreadable if it was reduced by a factor of 10. This is illustrated in FIG. 16, however, in FIG. 16 the thumbnail page 1660 and the full rendered page 1650 are not drawn at the same scale. Referring to FIG. 16, codestream 1610 is used in two different pages. For example, the page1/layout1 box 1601 contains a pointer to codestream 1610 and instructions to scale and position it on a rendered page 1650. The page2/ layout1 box 1604 contains a pointer to codestream 1610 and instructions to scale and position it on a rendered page 1660. Likewise boxes 1603 and 1609 use codestream box 1630 on the two different pages. However, codestream 1620 is only used on one page.

The file described below lists some of the parameters of some of the boxes to indicate positioning of objects on the page and within the thumbnail. The definition of these parameters is in Part 6 of the JPEG 2000 standard.

```
JPEG 2000 Signature box
File Type box
Compound Image Header box
Page Collection box
    Page Collection Locator box
    Page Table box
Page Box (Main Page)
    Page Header box
        PHeight=2200, PWidth=1700
    Layout Object box
        Layout Object Header box
            ID=1, LHeight=200, LWidth=1000, LVoff=200,
            LHoff=350, Style=2
        Object box
            Object Header box
                OFFSET points to Continguous Codestream #1
            JP2 Header box
                Image Header box
    Layout Object box
        Layout Object Header box
            ID=2, LHeight=1400, LWidth=1200, LVoff=500,
            LHoff=250, Style=2
        Object box
            Object Header box
                OFFSET points to Continguous Codestream #2
            JP2 Header box
                Image Header box
    Layout Object box
        Layout Object Header box
            ID=3, LHeight=100, LWidth=500, LVoff=2000,
            LHoff=1000, Style=2
        Object box
            Object Header box
                OFFSET points to Contiguous Codestream #3
            JP2 Header box
                Image Header box
Page Box (Thumbnail Page)
    Page Header box
        PHeight=220 PWidth=170
    Layout Object box
        Layout Object Header box
            ID=1, LHeight=20, LWidth=100, LVoff=10,
            LHoff=35, Style=2
        Object box
            Object Header box
                OFFSET points to Contiguous Codestream #1
            Object Scale Box
                VRN=1,VRD=10,HRN=1,HRD=10
            JP2 Header box
                Image Header box
    Layout Object box
        Layout Object Header box
            ID=2, LHeight=20, LWidth=100, LVoff=180,
            LHoff=40, Style=2
        Object box
            Object Header box
                OFFSET points to Contiguous Codestream #3
            Object Scale Box
                VRN=1,VRD=5,HRN=1,HRD=5
            JP2 Header box
                Image Header box
Contiguous Codestream box #1
Contiguous Codestream box #2
Contiguous Codestream box #3
```

Storing Pages as Different Formats via Layout Objects

Just as a separate page can be added for a thumbnail that makes use of layout objects from the main page, a separate page can be added for an alternative view of the document. This new page might contain all of the same layout objects, but scaled differently, and positioned differently on a page of a different size.

Thus, one JPM file could store FIG. 9 and FIG. 10. There are two Page Boxes, and a Layout Object box within each page box for every item on the page, but the data itself is not duplicated.

The overhead from all of the layout boxes might be significant and will reduce compression. However, some systems might choose to store one file on a server which contains both layouts, and parse it to provide the desired layout. Alternatively, a different layout could be generated when a request is made for a page with a specific viewing width.

ALTERNATIVE EMBODIMENTS

In one embodiment, a determination of the importance ranking of text zones may be augmented by an individual providing keywords. That is, the importance ranking may be based on keywords. In another embodiment, an individual may assist in selecting bounding boxes as a way to perform the importance ranking.

In another embodiment, if the text undergoes OCR and produces OCR errors in its results, a bitmap from the original image may be used in place of the OCR result. This ensures that the combined result does not contain the error.

In one embodiment, the layout analysis software may be replaced with a dictionary-based methodology, such as JBIG2 (Information Technology—Lossy/Lossless Coding of Bi-level Images, ISO/IEC 14492:2001, Dec. 15, 2001), to find the size of words in a document and to manipulate a document to find out where those words occur.

In one embodiment, the reflow process results in all text being a uniform size. Note that this would require different scaling factors and also that each text zone includes text that is the same size. In another embodiment, the results of the reflow process are that all text maintains its relative size to the rest of the text. In other words, the ratio of the text sizes before reflow are the same as after reflow. Other monotonic mappings may be used.

For systems already performing OCR, the layout information is simply discarded once the OCR has been performed. The generation of the OCR information can be costly in terms of computation time. However, using the analysis layout information according to the teachings described herein requires only a small amount of extra work in comparison to the amount of work already performed in the document analysis.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
generating a multiresolution segmentation image for an electronic version of a document;
performing a connected components analysis on the multiresolution segmentation image to generate a list of image connected components, along with their locations within the multiresolution segmentation image and multiresolution bit distribution;

performing layout analysis on the electronic version of a document to locate text zones;

assigning attributes to text zones in the electronic version of the document;

creating a list of text components associated with the text zones; and merging component images associated with the image connected components of the multiresolution segmentation image and the text components.

2. The method defined in claim 1 further comprising creating a component
image of text zones using bounding boxes of layout analysis.

3. The method defined in claim 1 further comprising obtaining attributes for each of the image components in the list of connected components.

4. The method defined in claim 3 wherein the attributes include the resolution of the component.

5. The method defined in claim 3 wherein the attributes include the location of the component.

6. The method defined in claim 3 wherein the attributes include an importance value for the component.

7. The method defined in claim 3 wherein the attributes include an indication of the smallest rectangle that contains the component.

8. The method defined in claim 3 wherein merging the component images
comprises computing the overlap between each image component with the text components.

9. The method defined in claim 1 further comprising subtracting at least
one text component from an image component if an amount of overlap is greater than a first threshold and less than a second threshold.

10. The method defined in claim 1 wherein merging is based on one or more attributes.

11. The method defined in claim 10 wherein the one or more attributes comprise an importance value.

12. The method defined in claim 10 wherein the one or more attributes comprise an importance from analysis of layout for text components.

13. An apparatus comprising:
means for generating a multiresolution segmentation image for an electronic version of a document;
means for performing a connected components analysis on the multiresolution segmentation image to generate a list of image connected components, along with their locations within the multiresolution segmentation image and multiresolution bit distribution;
means for performing layout analysis on the electronic version of a document to locate text zones;
means for assigning attributes to text zones in the electronic version of the document;
means for creating a list of text components associated with the text zones; and
means for merging component images associated with the image connected components of the multiresolution segmentation image and the text components.

14. The apparatus defined in claim 13 further comprising means for creating
a component image of text boxes using bounding boxes of layout analysis.

15. The apparatus defined in claim 13 further comprising means for obtaining attributes for each of the image components in the list of connected components.

16. An article of manufacture comprising one or more computer readable storage media containing executable instructions that, when executed by a system, cause the system to:
generate a multiresolution segmentation image for an electronic version of a document;
perform a connected components analysis on the multiresolution segmentation image to generate a list of image connected components, along with their locations within the multiresolution segmentation image and multiresolution bit distribution;
perform layout analysis on the electronic version of a document to locate text zones;
assign attributes to text zones in the electronic version of the document;
create a list of text components associated with the text zones; and
merge component images associated with the image connected components of the multiresolution segmentation image and the text components.

17. The article defined in claim 16 further comprising instructions which
when executed by the system cause the system to create a component image of text boxes using bounding boxes of layout analysis.

18. The article defined in claim 16 further comprising obtain attributes for each of the image components in the list of connected components.

* * * * *